United States Patent
Watanabe

(10) Patent No.: US 12,149,449 B2
(45) Date of Patent: Nov. 19, 2024

(54) COMMUNICATION SYSTEM, DEVICE, AND COMMUNICATION METHOD

(71) Applicant: KIOXIA CORPORATION, Tokyo (JP)

(72) Inventor: Manabu Watanabe, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 588 days.

(21) Appl. No.: 17/461,844

(22) Filed: Aug. 30, 2021

(65) Prior Publication Data

US 2022/0086093 A1    Mar. 17, 2022

(30) Foreign Application Priority Data

Sep. 16, 2020 (JP) ................ 2020-155881

(51) Int. Cl.
| | | |
|---|---|---|
| H04L 47/10 | (2022.01) | |
| H04L 43/0894 | (2022.01) | |
| H04L 47/12 | (2022.01) | |
| H04L 47/24 | (2022.01) | |

(52) U.S. Cl.
CPC .......... H04L 47/13 (2013.01); H04L 43/0894 (2013.01); H04L 47/12 (2013.01); H04L 47/24 (2013.01)

(58) Field of Classification Search
CPC ..... H04L 47/13; H04L 43/0894; H04L 47/12; H04L 47/24
See application file for complete search history.

(56) References Cited

U.S. PATENT DOCUMENTS

| | | | |
|---|---|---|---|
| 8,660,125 B2 | 2/2014 | Nishioka | |
| 2002/0151306 A1 | 10/2002 | Ohtani et al. | |
| 2003/0031126 A1 | 2/2003 | Mayweather et al. | |
| 2008/0155215 A1 | 6/2008 | Matsuzaki et al. | |
| 2010/0122003 A1* | 5/2010 | Hu ........................ | H04B 10/65 710/110 |
| 2011/0085799 A1 | 4/2011 | Mizutani | |
| 2012/0177050 A1 | 7/2012 | Fujimoto | |
| 2012/0254600 A1 | 10/2012 | Fujimoto | |
| 2013/0013975 A1 | 1/2013 | Yasufuku | |
| 2013/0326262 A1* | 12/2013 | Taylor ................ | G06F 11/2002 714/4.11 |
| 2014/0129750 A1 | 5/2014 | Ishii et al. | |

(Continued)

FOREIGN PATENT DOCUMENTS

| | | |
|---|---|---|
| CN | 1534901 A | 10/2004 |
| CN | 101107874 A | 1/2008 |

(Continued)

*Primary Examiner* — Siming Liu
(74) *Attorney, Agent, or Firm* — Kim & Stewart LLP

(57) ABSTRACT

A communication system includes a controller, a plurality of devices, and a communication channel to which the controller and the plurality of devices are connected in a ring, and over which a communication frame including a plurality of packets is transmitted as differential signals. Each device monitors a data transmission amount per unit time, and is configured to determine whether or not the monitored data transmission amount exceeds a threshold value, and insert data into one of the packets in the communication frame when the monitored data transmission amount is equal to or less than the threshold value.

18 Claims, 11 Drawing Sheets

(56) References Cited

U.S. PATENT DOCUMENTS

| | | |
|---|---|---|
| 2014/0281325 A1 | 9/2014 | Meaney et al. |
| 2018/0332291 A1* | 11/2018 | Komine ........... H04N 21/23439 |
| 2019/0044809 A1 | 2/2019 | Willis et al. |
| 2019/0050337 A1 | 2/2019 | Kaga et al. |
| 2021/0297511 A1 | 9/2021 | Watanabe |
| 2022/0004510 A1 | 1/2022 | Sun et al. |

FOREIGN PATENT DOCUMENTS

| | | |
|---|---|---|
| CN | 102045110 A | 5/2011 |
| CN | 102135859 A | 7/2011 |
| CN | 103635894 A | 3/2014 |
| CN | 109154906 A | 1/2019 |
| CN | 109992205 A | 7/2019 |
| JP | H05-167602 A | 7/1993 |
| JP | 2004-088208 A | 3/2004 |
| JP | 2004533142 A | 10/2004 |
| JP | 2009239656 A | 10/2009 |
| JP | 2013017090 A | 1/2013 |
| JP | 2014059883 A | 4/2014 |
| JP | 5696308 B2 | 4/2015 |
| WO | 2011037168 A1 | 3/2011 |

* cited by examiner

COMMUNICATION SYSTEM, DEVICE, AND COMMUNICATION METHOD

CROSS-REFERENCE TO RELATED APPLICATIONS

This application is based upon and claims the benefit of priority from Japanese Patent Application No. 2020-155881, filed Sep. 16, 2020, the entire contents of which are incorporated herein by reference.

FIELD

Embodiments described herein relate generally to a communication system, a device, and a communication method.

BACKGROUND

In a communication system having a controller and a plurality of devices, the controller and the plurality of devices transfer packets via a communication channel. A fair and efficient transfer of the packets through such a system is desired.

DETAILED DESCRIPTION

Figure 1:
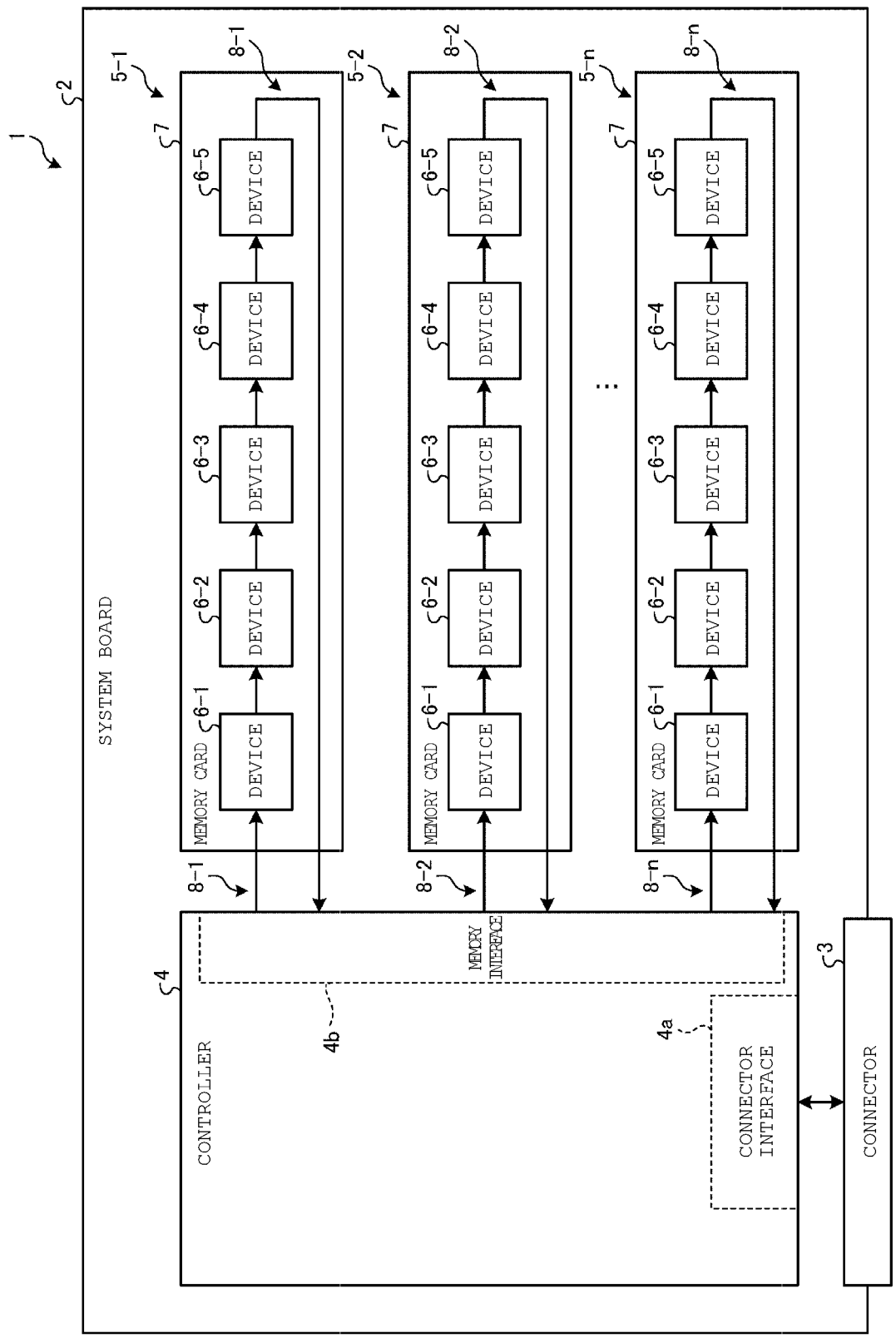
FIG. 1 is a diagram illustrating a configuration of a communication system according to a first embodiment.

Embodiments provide a communication system, a device, and a communication method capable of appropriately transferring packets.

In general, according to one embodiment, there is provided a communication system that has a controller, a plurality of devices, and a communication channel to which the controller and the plurality of devices are connected in a ring, and over which a communication frame including a plurality of packets is transmitted as differential signals. The device monitors a data transmission amount per unit time. The device is configured to determine whether or not the monitored data transmission amount exceeds a threshold value, and insert data into one of the packets in the communication frame when the monitored data transmission amount is equal to or less than the threshold value.

The communication system according to the embodiment will be described in detail with reference to the accompanying drawings. The present disclosure is not limited to these embodiments.

First Embodiment

A communication system according to a first embodiment has a controller and a plurality of devices, and the controller and the plurality of devices are connected via a communication channel. In such a communication system, the controller and the plurality of devices transfer packets via the communication channel. The devices are, for example, NAND flash memory devices, and the communication system is, for example, a solid state drive (SSD).

In the communication system in which the controller and the plurality of devices are connected by the communication channel, large capacity and high speed data transmission may be required, and ultra-wideband (for example, 200 GB/s or more) and large capacity data transmission may be required. When the communication system is applied to storage of data generated by a graphic processing unit (GPU), the communication system is required to be able to send and receive large amounts of data to the GPU at high speed in order to utilize the processing capability of the GPU. When the communication system is applied to a machine learning of an artificial intelligence (AI) processor, the communication system is required to be able to send and receive large amounts of data to and from the AI processor at high speed in order to efficiently perform the machine learning of the AI processor.

When performing high speed communication, communication techniques using a differential signal having excellent noise resistance is desirable. When using such communication techniques, noise between the differential signals can be canceled at the time of reception, and a reception process of the signal can be performed with high accuracy so that the reliability of the communication can be easily improved.

In the communication system in which a controller and a plurality of devices are connected via a peer-to-peer communication channel, in order to implement ultra-wideband and large capacity data transmission, a first technique is conceivable in which the communication channel between the controller and the plurality of devices is configured with a large number of communication lines. In this first technique, the controller is provided with a large number of connection pins. For example, when each device has 20 pins of 2 Gbps/pin and is capable of communicating 8-bit data differentially at the same time, 100 devices are connected in order to implement 200 GB/s as a bandwidth of the communication channel. The controller is provided with 20×100=2000 pins. Thereby, the cost of the communication system can increase significantly. That is, the first technique is not practical.

A second technique is also conceivable, which configures a communication system in which a controller and a plurality of devices are connected via a communication channel in a ring shape, and in which the controller exclusively transmits differential serial signals via the communication channel between the plurality of devices. In this second technique, since a high speed serial interface is mounted on each device and the plurality of devices are ring-connected to the controller, high speed communication may be implemented with a small number of pins.

However, since the signal transmission from the controller to the plurality of devices is exclusive, there is a limit to the data transfer efficiency from the controller to each device, and it is difficult to implement ultra-wideband and large capacity data transmission.

In contrast to this, in a communication system in which a controller and a plurality of devices are connected via a communication channel having a ring shape, a third technique is conceivable in which a plurality of packets, each having a fixed data length, are transmitted, and each device can insert and remove packets from the communication frame according to a predetermined condition. In this third technique, for packets that are transmitted on a communication channel in a temporally continuous manner, a number of packets determined according to a communication capability of the device and a communication bandwidth of the communication channel are grouped in one communication frame. By allowing the plurality of devices to insert and remove packets with respect to a plurality of packets grouped in one communication frame, the signal transmission from the controller to the plurality of devices and the signal transmission from the plurality of devices to the controller can be performed in parallel. As a result, the bandwidth of the communication channel can be continuously utilized to improve the performance, and communication with ultra-wideband and large capacity data transmission may be implemented.

In this third technique, if the number of ring-connected devices is equal to or less than the number of packets included in the communication frame, a situation in which there is no packet capable of including the information desired to be transmitted, does not arise when there is information desired to be transmitted.

However, when the number of ring-connected devices is larger than the number of packets included in the communication frame, in the devices on the downstream side of the communication channel among each of the devices ring-connected to the controller, there may arise a situation in which there is no packet that is capable of including the information desired to be transmitted even when there is information that is desired to be transmitted.

Therefore, in the present embodiment, based on the third technique, a transmission authority of each device is guaranteed to be uniform over time, and the packet transfer in the communication system is optimized by applying a bandwidth restriction to the amount of data that each device can transmit per unit time.

Specifically, the communication system 1 may be configured as illustrated in FIG. 1. FIG. 1 is a diagram illustrating a configuration of the communication system 1.

The communication system 1 has a system board 2, a connector 3, a controller 4, a plurality of memory cards 5 (5-1 to 5-*n*), and a plurality of communication channels 8 (8-1 to 8-*n*).

The system board 2 is, for example, an accelerator board that supports ultra-wideband (for example, 200 GB/s or more) and large capacity data transmission.

The connector 3 is disposed on a part of the system board 2, and another device (computer or the like) can be connected to the connector 3. The controller 4 has a connector interface circuit 4*a* and sends and receives information with other devices via the connector interface circuit 4*a* and the connector 3.

Each of the memory cards 5-1 to 5-*n* has a substrate 7 and a plurality of devices 6 (6-1 to 6-5) connected in series. The plurality of devices 6-1 to 6-5 are mounted on the substrate 7, and the substrate 7 is mounted on the system board 2. The plurality of devices 6-1 to 6-5 may be arranged along a single direction of the substrate 7. Each device 6 is a memory device such as a NAND flash memory, for example. The controller 4 has a memory interface circuit 4*b* and is communicably connected to the plurality of devices 6-1 to 6-5 via the memory interface circuit 4*b* and the communication channel 8.

The controller 4 sends and receives information with each device 6 via the memory interface circuit 4*b* and the communication channel 8. The memory interface circuit 4*b* is configured so as to be capable of communicating differential serial signals.

The plurality of communication channels 8-1 to 8-*n* correspond respectively to the plurality of memory cards 5-1 to 5-*n*. Each communication channel 8 ring-connects the memory interface circuit 4*b* and the plurality of devices 6-1 to 6-5 provided in the memory card 5 that corresponds to the memory interface circuit 4*b*. That is, the controller 4 and the device 6-1 are connected via the communication channel 8, the devices 6-2 to 6-5 are connected via the communication channel 8, and the device 6-5 and the controller 4 are connected via the communication channel 8. Each communication channel 8 is capable of transmitting a differential serial signal.

Each device 6-1 to 6-5 is configured so as to be capable of communicating a differential serial signal. Each device 6-1 to 6-5 communicates a plurality of packets with a differential serial signal via the communication channel 8. Each of the plurality of packets has a fixed data length. For packets that are transmitted on the communication channel 8 in a temporally continuous manner, a number of packets determined according to a communication capability of the device 6 and a communication bandwidth of the communication channel 8 are grouped together in one communication frame. The number of packets included in the communication frame corresponds to a bandwidth of the communication channel 8, and by inserting packets into the communication frame by each device, the bandwidth of the communication channel 8 is consumed with the packets. When a predetermined condition is satisfied, each of the devices 6-1 to 6-4 executes the insertion and removal of the packets with respect to the communication frame. At this time, the communication frame may include a number of packets determined according to the required bandwidth and the bandwidth of each device.

The communication system 1 may have a configuration in which the system board 2 is omitted. The connector interface circuit 4*a* may be directly connected to an external device without going through the connector 3. In addition, the system board 2 and the substrate 7 may be integrally formed.

Figure 2:
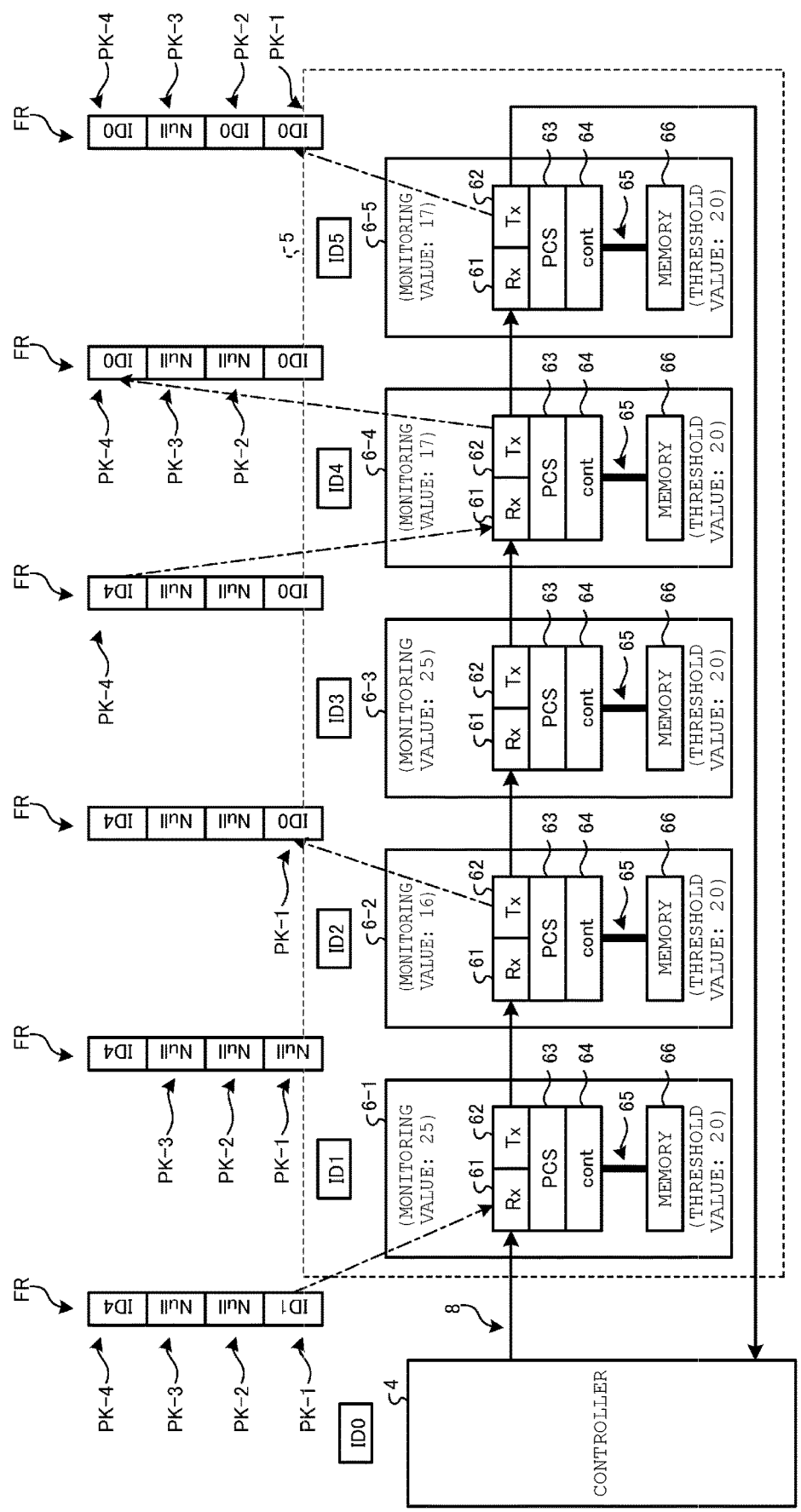
FIG. 2 is a diagram illustrating a configuration and operation of the communication system according to the first embodiment.

For example, as illustrated in FIG. 2, each device 6 has a receiving unit (Rx) 61, a transmitting unit (Tx) 62, a protocol conversion unit (PCS) 63, a control circuit (cont) 64, an internal bus 65, and a memory 66. FIG. 2 is a diagram illustrating a configuration and operation of the communication system 1 and illustrates a connection configuration of the controller 4 and one memory card 5. The control circuit 64 is connected to the memory 66 for accessing the memory 66 via the internal bus 65. The memory 66 may be a non-volatile memory such as a NAND flash memory. In each device 6, the receiving unit (Rx) 61, the transmitting unit (Tx) 62, the protocol conversion unit (PCS) 63, and the control circuit (cont) 64 are components of a circuit and can function as a communication interface circuit.

When it is assumed that a communication bandwidth of the communication channel 8 is $C_8$ and a communication capability of each device 6 is $C_6$, the number of packets included in the communication frame may be given as the maximum value of $N_{FR}$ that satisfies following Equation 1.

$$N_{FR} \le C_8/C_6 \qquad \text{Equation 1}$$

Figure 3:
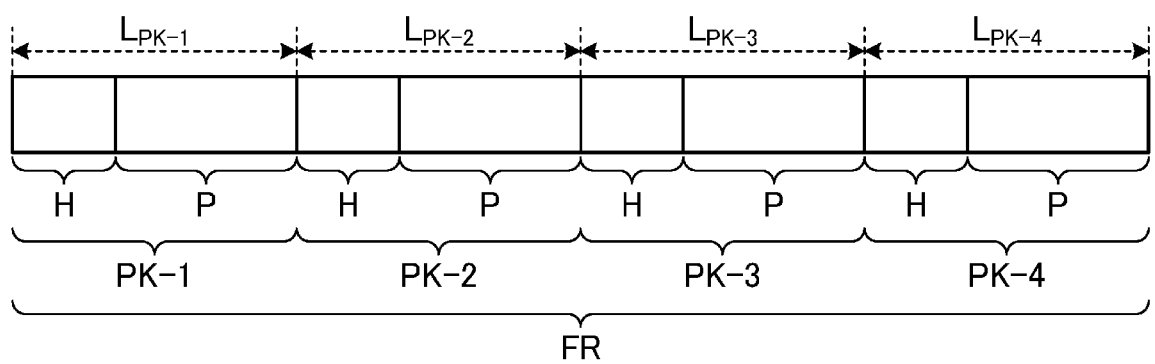
FIG. 3 is a diagram illustrating a configuration of each packet in the first embodiment.

For example, when the communication bandwidth required for the communication system 1 is 200 [Gbps] and the number of the memory cards 5 connected in parallel to the controller 4 is n=4, the communication bandwidth required per memory card is 200/4=50 [Gbps]. In accordance with the required communication bandwidth, when the communication bandwidth of the communication channel 8 is $C_8$=56 Gbps and the communication capability $C_6$ of each device 6 is 14 Gbps, the maximum value of $N_{FR}$ that satisfies Equation 1 is 4. In this case, the communication frame FR may include four packets PK (PK-1 to PK-4) as illustrated in FIG. 3. FIG. 3 is a diagram illustrating a configuration of the communication frame FR. FIG. 3 illustrates a configuration in which the communication frame FR includes four packets. Each of the packets PK-1, PK-2, PK-3, and PK-4 has a fixed data length $L_{PK-1}$, $L_{PK-2}$, $L_{PK-3}$, $L_{PK-4}$. The fixed data length $L_{PK}$ of each packet PK satisfies following Equation 2.

$$L_{PK-1}=L_{PK-2}=L_{PK-3}=L_{PK-4} \qquad \text{Equation 2}$$

Each packet PK includes a header H and a payload P. The data length of the header H may be different and the data length of the payload P may be different in a plurality of packets PK-1 to PK-4 but the fixed data length $L_{PK}$ of each packet PK satisfies Equation 2.

The communication frame FR is configured such that a plurality of packets PK are grouped from the viewpoint of the bandwidth to be consumed by each device 6.

Figure 4:
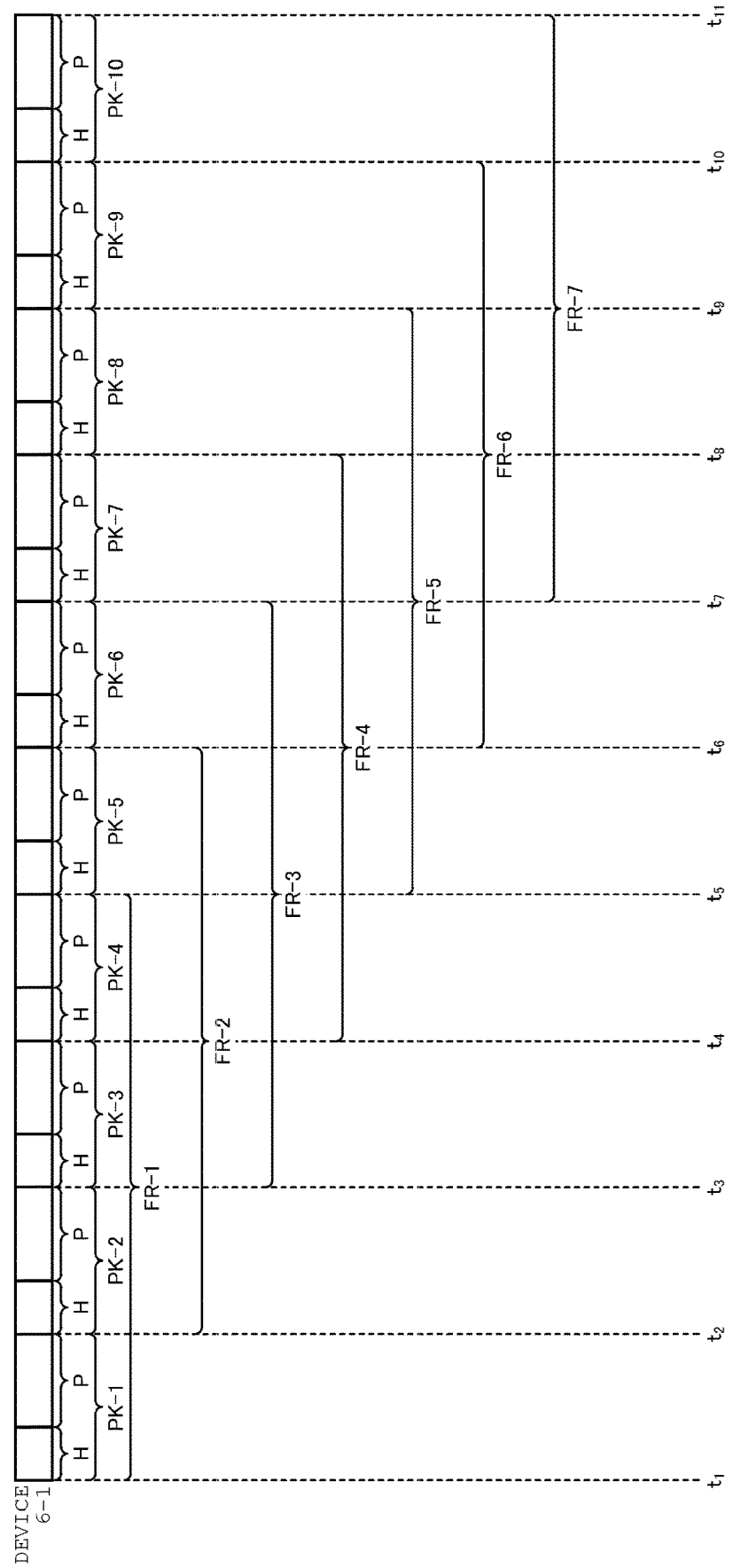
FIG. 4 is a diagram illustrating a communication frame that changes over time when viewed from a device in the first embodiment.

Therefore, when viewed from a certain device 6-1 as a reference, the communication frame FR changes for each packet PK as illustrated in FIG. 4. FIG. 4 is a diagram illustrating the communication frame FR that changes over time when viewed from the device.

At the timing t1, the communication frame FR-1 includes packets PK-1 to PK-4. When the predetermined condition is satisfied, the device 6-1 is capable of inserting and removing the packet PK-1 at the timing t1, is capable of inserting and removing the packet PK-2 at the timing t2, . . . and is capable of inserting and removing the packet PK-4 at the timing t4.

At timing t2, the communication frame FR-2 includes packets PK-2 to PK-5. When the predetermined condition is satisfied, the device 6-1 is capable of inserting and removing the packet PK-2 at the timing t2, is capable of inserting and removing the packet PK-3 at the timing t3, . . . and is capable of inserting and removing the packet PK-5 at the timing t5.

At timing t7, the communication frame FR-7 includes packets PK-7 to PK-10. When the predetermined condition is satisfied, the device 6-1 is capable of inserting and removing the packet PK-7 at the timing t7, is capable of inserting and removing the packet PK-8 at the timing t8, . . . and is capable of inserting and removing the packet PK-10 at the timing t10.

Figure 5:
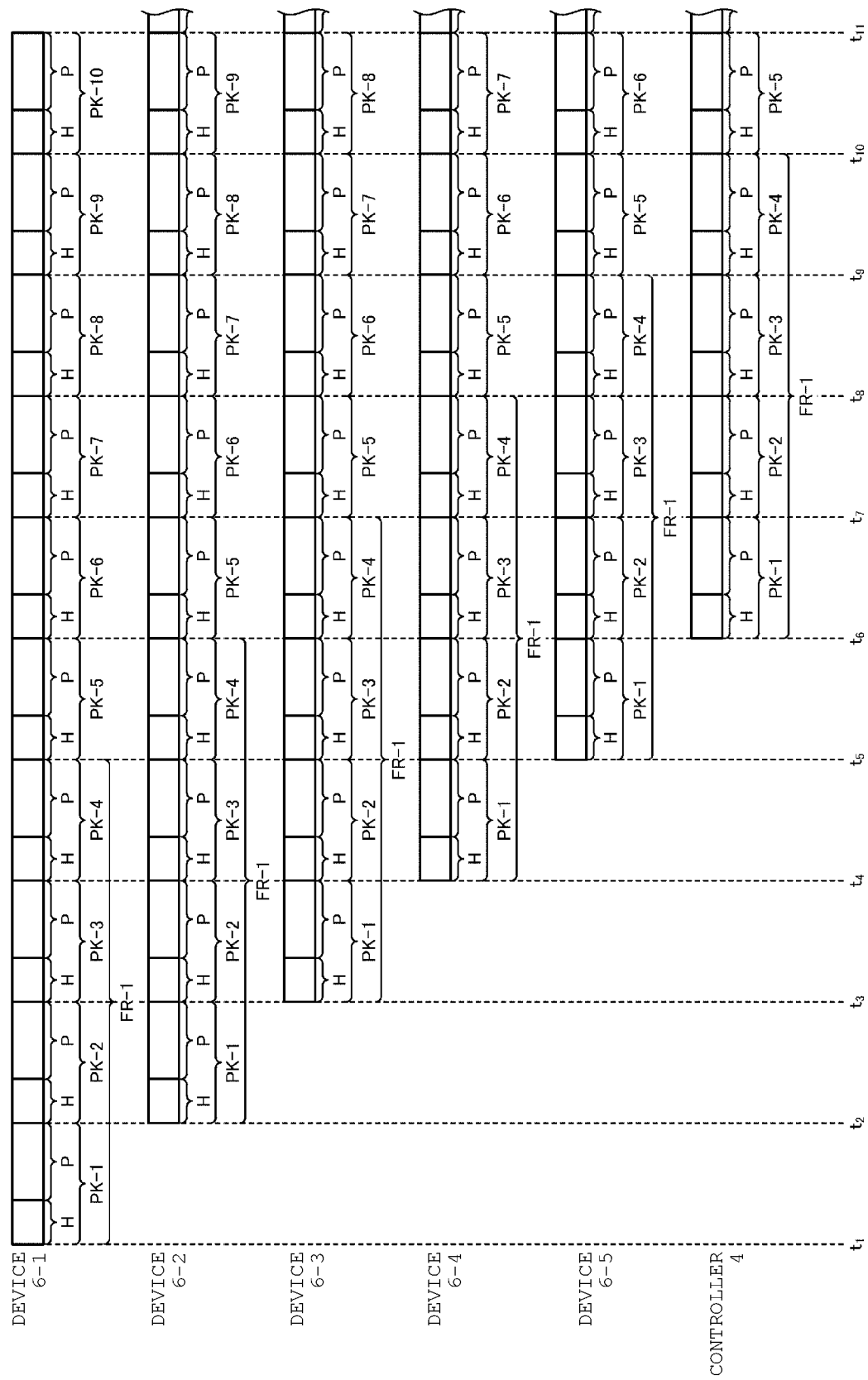
FIG. 5 is a diagram illustrating the communication frame transmitted to a controller via a plurality of devices of the first embodiment.

When viewed with reference to the plurality of devices 6-1 to 6-5 and the controller 4, the communication frame FR is subsequently propagated for each UI as illustrated in FIG. 5. FIG. 5 is a diagram illustrating the communication frame FR transmitted to the controller 4 via the plurality of devices 6-1 to 6-5.

At the timing t1, the communication frame FR-1 is propagated to the device 6-1. When the predetermined condition is satisfied, the device 6-1 is capable of inserting and removing the packet PK-1 at the timing t1, is capable of inserting and removing the packet PK-2 at the timing t2, . . . and is capable of inserting and removing the packet PK-4 at the timing t4.

At timing t2, the communication frame FR-1 is propagated to the device 6-2. When the predetermined condition is satisfied, the device 6-2 is capable of inserting and removing the packet PK-1 at the timing t2, is capable of inserting and removing the packet PK-2 at the timing t3, . . . and is capable of inserting and removing the packet PK-4 at the timing t5.

At the timing t5, the communication frame FR-1 is propagated to the device 6-5. When the predetermined condition is satisfied, the device 6-5 is capable of inserting and removing the packet PK-1 at the timing t5, is capable of inserting and removing the packet PK-2 at the timing t6, . . . and is capable of inserting and removing the packet PK-4 at the timing t8.

At the timing t6, the communication frame FR-1 is propagated to the controller 4. The controller 4 starts receiving the communication frame FR-1 at the timing t6 and completes the reception of the communication frame FR-1 at the timing t10.

As illustrated in FIG. 1, in the communication system 1, each memory card 5 has, for example, five devices 6 (6-1 to 6-5). As illustrated in FIG. 2, five devices 6-1 to 6-5 are ring-connected to the controller 4 via the communication channel 8. As illustrated in FIG. 3, the communication frame FR includes four packets PK-1 to PK-4. The number of ring-connected devices (5) is larger than the number of packets included in the communication frame FR (4).

When the communication frame FR is transmitted from the controller 4 illustrated in FIG. 2 via the communication channel 8, each of the devices 6-1 to 6-5 executes the insertion and removal of the packets PK with respect to the communication frame FR according to the predetermined condition. That is, according to the number $N_{FR}$ determined as in Equation 1, the controller 4 transmits the communication frame FR that is configured as illustrated in FIG. 3 to the communication channel 8. The required communication bandwidth may be consumed by each of the devices 6-1 to 6-5 subsequently inserting and removing the packets PK in the communication frame FR in parallel.

When each device 6 receives the communication frame FR via the communication channel 8, each device 6 checks the header H of each of the plurality of packets PK included in the communication frame FR. The device 6 extracts a packet PK from the communication frame FR depending on whether the header H of the packet PK includes its identification information as a transmission destination.

Each device 6 has a bandwidth restriction on the amount of data transmitted per unit time. A threshold value $A_{th}$ for the transmission amount per unit time is determined in advance in each device 6. The threshold value $A_{th}$ can be experimentally determined in advance so that the bandwidth restriction is applied at an appropriate level for the communication environment of the assumed communication channel 8. Each device 6 monitors the transmission amount per unit time for each predetermined cycle (for example, a cycle for receiving one packet PK). The transmission amount per unit time for a particular device is an amount that depends on the data transfer amount transmitted from the device to the communication channel 8 per unit time.

For example, each device 6 monitors the data transfer amount during a predetermined monitoring time (for example, time for receiving 100 packets PK) for each predetermined cycle. Each device 6 specifies that packets PK of the total data transfer amount $D_{all}$ is transmitted on the communication channel 8 in a temporally continuous manner at the predetermined monitoring time. Each device 6 specifies that it inserted the information having the data transfer amount $D_6$ in total into the packet PK at the predetermined monitoring time. Each device 6 performs a calculation shown in following Equation 3 to obtain the transmission amount per unit time, $A_6$. $A_6$ indicates the ratio of the device 6 occupying the available bandwidth.

$$A_6 = D_6/D_{all} \quad \text{Equation 3}$$

Alternatively, when Equation 2 is satisfied, each device monitors the number of packets at the predetermined monitoring time. Each device 6 specifies that $N_{all}$ (for example, 100) packets PK is transmitted on the communication channel 8 in a temporally continuous manner at the predetermined monitoring time. Each device 6 specifies that it inserted the information into the $N_6$ packets PK at the predetermined monitoring time. Each device 6 performs a calculation shown in following Equation 4 to obtain the transmission amount of per unit time, $A_6$.

$$A_6 = N_6/N_{all} \quad \text{Equation 4}$$

Each device 6 compares $A_6$ with the threshold value $A_{th}$. The unit of $A_6$ and the threshold value $A_{th}$ may be a percentage (%).

When $A_6$ of a device exceeds the threshold value $A_{th}$, transmission authority is not given to the device because it occupies too much bandwidth of the communication channel 8. If the device does not have the transmission authority with respect to the communication channel 8, the predetermined information cannot be inserted into the packet PK. When a state in which the predetermined information cannot be inserted into the packet PK from a certain device 6 continues, $A_6$, which is monitored by the device, gradually decreases with time.

When $A_6$ of a device is equal to or less than the threshold value $A_{th}$, transmission authority is given to the device because the use of the bandwidth of the communication channel 8 is appropriately restricted. Depending on the transmission authority given to the device, the device inserts the predetermined information into the packet PK corresponding to the header H including the identification information thereof. Alternatively, depending on the transmission authority given to the device, the device 6 can insert the predetermined information into the packet PK which is a null packet. A null packet is a packet PK in which the payload P does not include valid data and the payload P is substantially empty (Null). The null packet often has a header that does not include information about the transmission destination or has an empty transmission destination (Null). The device can insert the predetermined information into the payload P corresponding to the header H which does not include the information about the transmission destination or in which the transmission destination is empty (Null).

In each device 6, Rx 61 is a physical layer and receives the communication frame FR from the controller 4 or the device 6 in the previous stage via the communication channel 8. The Rx 61 performs a physical process such as waveform equalization on the received communication frame FR and supplies the communication frame FR to a PCS 63. The PCS 63 performs protocol conversion of the communication frame FR supplied from the physical layer Rx 61 into the communication frame of an upper layer. The upper layer is a layer higher than the physical layer when the communication layer structure is roughly divided into two, and includes, for example, a connection layer and a protocol conversion layer. The PCS 63 supplies the communication frame FR converted to the upper layer to the control circuit 64.

The control circuit 64 checks the header H of each of the plurality of packets PK included in the communication frame FR. When the header H of the packet PK includes the identification information of the device as the transmission destination, the control circuit 64 extracts the information from the payload P of the packet PK. When the extracted information is a write command and write data, the control circuit 64 accesses the memory 66 via an internal bus 65 and writes the write data to the memory 66 in accordance with the write command.

The threshold value $A_{th}$ for the transmission amount per unit time is determined in advance in the control circuit 64. The control circuit 64 monitors $A_6$ for each predetermined cycle. When $A_6$ exceeds the threshold value $A_{th}$, the control circuit 64 determines that the transmission authority is not given because it occupies too much bandwidth of the communication channel 8. When $A_6$ is equal to or less than the threshold value $A_{th}$, the control circuit 64 determines that the transmission authority is given because the use of the bandwidth of the communication channel 8 is appropriately restricted.

When the transmission authority is given and there is information to be included in the packet PK, the control circuit 64 updates the communication frame FR by converting the transmission destination in the header H of the packet PK from its identification information into the identification information of the controller 4, converting the transmission source from the identification information of the controller 4 into its identification information, and including the predetermined information in the payload P of the packet PK. When the predetermined information is read data for the read command included in the received communication frame FR, the control circuit 64 includes the read data received from the memory 66 via the internal bus 65 in the payload P of the packet PK.

When the transmission authority is not given or there is no predetermined information to be included in the packet PK, the control circuit 64 updates the communication frame FR by erasing the information of the header H and the payload P of the packet PK to make the header H and the payload P empty (Null). The control circuit 64 supplies the updated communication frame FR to the PCS 63 as an upper layer communication frame FR.

Upon receiving the communication frame FR of the upper layer, the PCS 63 performs the protocol conversion of the communication frame FR of the upper layer into the communication frame FR of the physical layer. The PCS 63 supplies the communication frame FR of the physical layer to the Tx 62. The Tx 62 is a physical layer, performs a physical process such as a waveform generation on the communication frame FR supplied from the PCS 63, and transmits the communication frame FR to the communication channel 8 toward the device 6 or the controller 4 in the subsequent stage.

For example, a use case illustrated in FIG. 2 can be considered. In the communication system 1, the identification information of the controller 4, the device 6-1, the device 6-2, the device 6-3, the device 6-4, and the device 6-5 are defined as ID0, ID1, ID2, ID3, ID4, and ID5, respectively. In each of the devices 6-1 to 6-5, 20 [%] is set in advance as a threshold value with respect to the transmission amount per unit time.

The controller 4 creates a communication frame FR in which the headers H for the two packets PK-1 and PK-4 include the identification information ID1 and ID4 as the transmission destination, and the corresponding payloads P include the information desired to be transmitted to the device 6, and the headers H for the two packets PK-2 and PK-3 are empty (Null), and the payloads P are empty (Null). The controller 4 transmits the created communication frame FR to the communication channel 8. The information desired to be transmitted to the device 6 includes information to be transmitted or information that needs to be transmitted.

When the device 6-1 receives the communication frame FR via the communication channel 8 from the controller 4, the device 6-1 checks the header H of each packet PK included in the received communication frame FR. As a result of the confirmation, the device 6-1 recognizes that, for example, the transmission destination of the packet PK-1 is its ID (ID1), and extracts information from the packet PK-1. The device 6-1 monitors the transmission amount per unit time and obtains a monitoring value of 25 [%]. The device 6-1 compares the monitoring value of 25 [%] with the threshold value of 20 [%] and determines that the transmission authority is not given because the monitoring value of 25 [%] exceeds the threshold value of 20 [%]. In accordance with this, even when there is information desired to be transmitted, the device 6-1 updates the communication frame FR by rewriting the header H of the packet PK-1 to empty (Null) and setting the payload P to empty (Null). The device 6-1 transmits the updated communication frame FR to the communication channel 8.

When the device 6-2 receives the communication frame FR via the communication channel 8 from the device 6-1, the device 6-2 checks the header H of each packet PK included in the received communication frame FR. As a result of the confirmation, the device 6-2 recognizes that the packet whose transmission destination is its ID (ID2) does not exist. The device 6-2 monitors the transmission amount per unit time and obtains a monitoring value of 16 [%]. The device 6-2 compares the monitoring value of 16 [%] with the threshold value of 20 [%] and determines that the transmission authority is given because the monitoring value of 16 [%] is equal to or less than the threshold value of 20 [%]. Since the transmission authority is given, the device 6-2 is capable of inserting the information into any of the null packets PK-1 to PK-3 when there is information desired to be transmitted to the controller 4. The device 6-2 updates the communication frame FR by rewriting the transmission destination of the header H of the packet PK-1 to ID0, rewriting the transmission source to its ID (ID2), and including in the payload P the information that is desired to be transmitted. The device 6-2 transmits the updated communication frame FR to the communication channel 8.

When the device 6-3 receives the communication frame FR via the communication channel 8 from the device 6-2, the device 6-3 checks the header H of each packet PK included in the received communication frame FR. As a result of the confirmation, the device 6-3 recognizes that the packet whose transmission destination is its ID (ID3) does not exist. The device 6-3 monitors the transmission amount per unit time and obtains a monitoring value of 25 [%]. The device 6-1 compares the monitoring value of 25 [%] with the threshold value of 20 [%] and determines that the transmission authority is not given because the monitoring value of 25 [%] exceeds the threshold value of 20 [%]. In accordance with this, the device 6-3 transmits the communication frame FR to the communication channel 8 without updating the communication frame FR even when there is information desired to be transmitted.

When the device 6-4 receives the communication frame FR via the communication channel 8 from the device 6-3, the device 6-4 checks the header H of each packet PK included in the received communication frame FR. As a result of the confirmation, the device 6-4 recognizes that, for example, the transmission destination of the packet PK-4 is its ID (ID4), and extracts information from the packet PK-4. The device 6-4 monitors the transmission amount per unit time and obtains a monitoring value of 17 [%]. The device 6-4 compares the monitoring value of 17 [%] with the threshold value of 20 [%] and determines that the transmission authority is given because the monitoring value of 17 [%] is equal to or less than the threshold value of 20 [%]. Since the transmission authority is given, the device 6-4 is capable of inserting the information into the packet PK-4 when there is information desired to be transmitted to the controller 4. The device 6-4 updates the communication frame FR by rewriting the transmission destination of the header H of the packet PK-4 to ID0, rewriting the transmission source to its ID (ID4), and including in the payload P the information that is desired to be transmitted. The device 6-4 transmits the updated communication frame FR to the communication channel 8.

When the device 6-5 receives the communication frame FR via the communication channel 8 from the device 6-4, the device 6-5 checks the header H of each packet PK included in the received communication frame FR. As a result of the confirmation, the device 6-5 recognizes that the packet whose transmission destination is its ID (ID5) does not exist. The device 6-5 monitors the transmission amount per unit time and obtains a monitoring value of 17 [%]. The device 6-5 compares the monitoring value of 17 [%] with the threshold value of 20 [%] and determines that the transmission authority is given because the monitoring value of 17 [%] is equal to or less than the threshold value of 20 [%]. Since the transmission authority is given, the device 6-5 is capable of inserting the information into any of the null packets PK-2 to PK-3 when there is information desired to be transmitted to the controller 4. The device 6-5 updates the communication frame FR by rewriting the transmission destination of the header H of the packet PK-2 to ID0, rewriting the transmission source to its ID (ID5), and including in the payload P the information that is desired to be transmitted. The device 6-5 transmits the updated communication frame FR to the communication channel 8.

When the controller 4 receives the updated communication frame FR via the communication channel 8 from the device 6-5, the controller 4 checks the header H of each packet PK included in the received communication frame FR. According to the confirmation results, the controller 4 recognizes that the packets PK-1, PK-2, and PK-4 among the plurality of packets PK-1 to PK-4 included in the communication frame FR are not null packets. In accordance with this, the controller 4 performs a predetermined reception process with respect to the packets PK-1, PK-2, and PK-4, and extracts the information included in the payloads P of the packets PK-1, PK-2, and PK-4 to perform a predetermined process. Regarding the communication frame FR, since the information is included in 3 packets PK-1, PK-2, and PK-4 among the 4 packets PK-1 to PK-4, it can be said that the bandwidth is validly utilized.

In the example of FIG. 2, among the plurality of devices 6-1 to 6-5, the transmission authority is not given to the devices 6-1 and 6-3 whose transmission amount per unit time exceeds the threshold value and the use of the bandwidth is restricted, and the transmission authority is given to the devices 6-2, 6-4, 6-5 whose transmission amount per unit time is equal to or less than the threshold value and the use of the bandwidth is allowed.

Thereafter, when the situation in which the transmission authority is not given to the devices 6-1 and 6-3 continues, the transmission amount per unit time monitored by the devices 6-1 and 6-3 gradually decreases with time. When the transmission amount per unit time becomes equal to or less than the threshold value, the transmission authority is given to the devices 6-1 and 6-3, because the use of the bandwidth is appropriately restricted. At the same time, among the devices 6-2, 6-4, and 6-5, when the transmission amount per unit time of the device exceeds the threshold value, the transmission authority is not given to the device 6 and the use of the bandwidth is restricted because it occupies too much bandwidth. This process is repeated over time, and when viewed over time, the transmission authority can be evenly given to the plurality of devices 6-1 to 6-5. As a result, the communication system 1 can efficiently improve its performance as a whole.

As described above, in the first embodiment, in the communication system 1, the bandwidth restriction is applied to the amount of data transmitted by each device 6 per unit time. Thereby, when the number of ring-connected devices 6 (for example, 5) is larger than the number of packets included in the communication frame FR (for example, 4), the transmission authority of each device 6 can be guaranteed evenly over time. As a result, the packet transfer in the communication system 1 can be optimized so that the communication system 1 can efficiently improve the performance as a whole.

Second Embodiment

Next, the communication system 101 according to the second embodiment will be described. In the following, the parts different from the first embodiment will be mainly described.

In the first embodiment, although the case where the threshold value $A_{th}$ for bandwidth restriction is fixedly set for each device is illustrated, the communication environment in each communication channel 8 may change dynamically depending on the frequency of command requests received by the controller 4 from an external device or the like. If the communication traffic on each communication channel 8 is high when the threshold value remains low, the bandwidth restriction may not work properly. If the communication traffic on each communication channel 8 is low when the threshold value remains high, the bandwidth restriction maybe too restrictive and the performance may deteriorate. In consideration of this, in the second embodiment, the threshold value $A_{th}$ for bandwidth restriction can be dynamically changed.

Figure 6:
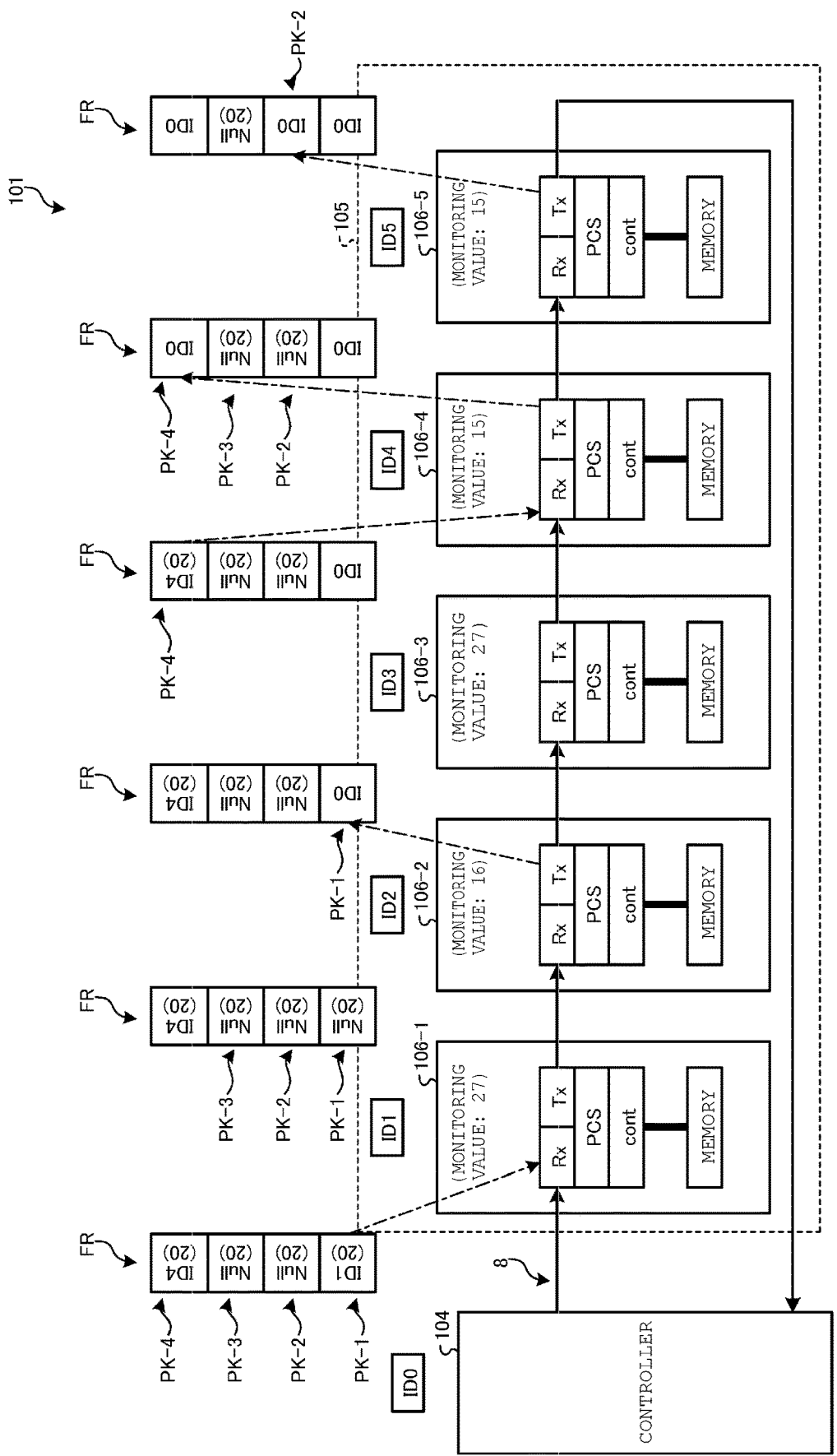
FIG. 6 is a diagram illustrating a configuration and operation of a communication system according to a second embodiment.

Specifically, as illustrated in FIG. 6, in the communication system 101, each memory card 105 has, for example, five devices 106 (106-1 to 106-5). FIG. 6 is a diagram illustrating a configuration and operation of the communication system 101 according to the second embodiment. The five devices 106-1 to 106-5 are ring-connected to the controller 104 via the communication channel 8. The communication frame FR includes four packets PK-1 to PK-4 (see FIG. 3). The number of ring-connected devices (5) is larger than the number of packets included in the communication frame FR (4).

The controller 104 creates a communication frame FR such that the header H of each packet PK includes information indicating the threshold value, and transmits the communication frame FR to the communication channel 8. Each device 106 acquires the threshold value $A_{th}$ in accordance with the information stored in the header H in the packet PK included in the received communication frame FR.

For example, a use case illustrated in FIG. 6 can be considered. In the communication system 101, the identification information of the controller 104, the device 106-1, the device 106-2, the device 106-3, the device 106-4, and the device 106-5 are defined as ID0, ID1, ID2, ID3, ID4, and ID5, respectively. In the initial state, the threshold value for the amount of transmission per unit time is not set for each of the devices 106-1 to 106-5.

The controller 104 determines the threshold value for the amount of transmission per unit time to 20 [%] in accordance with the current communication environment. The controller 104 creates a communication frame FR in which the headers H for the two packets PK-1 and PK-4 include the identification information ID1 and ID4 as the transmission destination and information about the threshold value of 20 [%], and the corresponding payloads P include the information desired to be transmitted to the device 106, and the headers H for the two packets PK-2 and PK-3 include information about the threshold value of 20 [%] and are empty (Null) for other parts, and the payloads P are empty (Null). The controller 104 transmits the created communication frame FR to the communication channel 8.

When the device 106-1 receives the communication frame FR via the communication channel 8 from the controller 104, the device 106-1 checks the header H of each packet PK included in the received communication frame FR. As a result of the confirmation, the device 106-1 acquires the information about the threshold value of 20 [%]. At the same time, as a result of the confirmation, the device 106-1 recognizes that, for example, the transmission destination of the packet PK-1 is its ID (ID1), and extracts information from the packet PK-1. The device 106-1 monitors the amount of transmission per unit time and obtains a monitoring value of 27 [%]. The device 106-1 compares the monitoring value of 27 [%] with the threshold value of 20 [%] and determines that the transmission authority is not given because the monitoring value of 27 [%] exceeds the threshold value of 20 [%]. In accordance with this, even when there is information desired to be transmitted, the device 106-1 updates the communication frame FR by leaving the information about the threshold value of 20 [%] in the header H of the packet PK-1 and rewriting the rest to empty (Null), and setting the payload P to empty (Null). The device 106-1 transmits the updated communication frame FR to the communication channel 8.

When the device 106-2 receives the communication frame FR via the communication channel 8 from the device 106-1, the device 106-2 checks the header H of each packet PK included in the received communication frame FR. As a result of the confirmation, the device 106-2 acquires the information about the threshold value of 20 [%]. At the same time, as a result of the confirmation, the device 106-2 recognizes that the packet whose transmission destination is its ID (ID2) does not exist. The device 106-2 monitors the amount of transmission per unit time and obtains a monitoring value of 16 [%]. The device 106-2 compares the monitoring value of 16 [%] with the threshold value of 20 [%] and determines that the transmission authority is given because the monitoring value of 16 [%] is equal to or less than the threshold value of 20 [%]. Since the transmission authority is given, the device 106-2 is capable of inserting the information into any of the null packets PK-1 to PK-3 when there is information desired to be transmitted to the controller 104. The device 106-2 updates the communication frame FR by rewriting the transmission destination of the header H of the packet PK-1 to ID0, rewriting the transmission source to its ID (ID2), and including in the payload P the information that is desired to be transmitted. The device 106-2 transmits the updated communication frame FR to the communication channel 8.

When the device 106-3 receives the communication frame FR via the communication channel 8 from the device 106-2, the device 106-3 checks the header H of each packet PK included in the received communication frame FR. As a result of the confirmation, the device 106-3 acquires the information about the threshold value of 20 [%]. At the same time, as a result of the confirmation, the device 106-3 recognizes that the packet whose transmission destination is its ID (ID3) does not exist. The device 106-3 monitors the amount of transmission per unit time and obtains a monitoring value of 27 [%]. The device 106-3 compares the monitoring value of 27 [%] with the threshold value of 20 [%] and determines that the transmission authority is not given because the monitoring value of 27 [%] exceeds the threshold value of 20 [%]. In accordance with this, the device 106-3 transmits the communication frame FR to the communication channel 8 without updating the communication frame FR even when there is information desired to be transmitted.

When the device 106-4 receives the communication frame FR via the communication channel 8 from the device 106-3, the device 106-4 checks the header H of each packet PK included in the received communication frame FR. As a result of the confirmation, the device 106-4 acquires the information about the threshold value of 20 [%]. At the same time, as a result of the confirmation, the device 106-4 recognizes that, for example, the transmission destination of the packet PK-4 is its ID (ID4), and extracts information from the packet PK-4. The device 106-4 monitors the amount of transmission per unit time and obtains a monitoring value of 15 [%]. The device 106-4 compares the monitoring value of 15 [%] with the threshold value of 20 [%] and determines that the transmission authority is given because the monitoring value of 15 [%] is equal to or less than the threshold value of 20 [%]. Since the transmission authority is given, the device 106-4 is capable of inserting the information into the packet PK-4 when there is information desired to be transmitted to the controller 104. The device 106-4 updates the communication frame FR by rewriting the transmission destination of the header H of the packet PK-4 to ID0, rewriting the transmission source to its ID (ID4), and including in the payload P the information that is desired to be transmitted. The device 106-4 transmits the updated communication frame FR to the communication channel 8.

When the device 106-5 receives the communication frame FR via the communication channel 8 from the device 106-4, the device 106-5 checks the header H of each packet PK included in the received communication frame FR. As a result of the confirmation, the device 106-5 acquires the information about the threshold value of 20 [%]. At the same time, as a result of the confirmation, the device 106-5 recognizes that the packet whose transmission destination is its ID (ID5) does not exist. The device 106-5 monitors the amount of transmission per unit time and obtains a monitoring value of 15 [%]. The device 106-5 compares the monitoring value of 15 [%] with the threshold value of 20 [%] and determines that the transmission authority is given because the monitoring value of 15 [%] is equal to or less than the threshold value of 20 [%]. Since the transmission authority is given, the device 106-5 is capable of inserting the information into any of the null packets PK-2 to PK-3 when there is information desired to be transmitted to the controller 104. The device 106-5 updates the communication frame FR by rewriting the transmission destination of the header H of the packet PK-2 to ID0, rewriting the transmission source to its ID (ID5), and including in the payload P the information that is desired to be transmitted. The device 106-5 transmits the updated communication frame FR to the communication channel 8.

When the controller 104 receives the updated communication frame FR via the communication channel 8 from the device 106-5, the controller 104 checks the header H of each packet PK included in the received communication frame FR. According to the confirmation results, the controller 104 recognizes that the packets PK-1, PK-2, and PK-4 among the plurality of packets PK-1 to PK-4 included in the communication frame FR are not null packets. In accordance with this, the controller 104 performs a predetermined reception process with respect to the packets PK-1, PK-2, and PK-4, and extracts the information included in the payloads P of the packets PK-1, PK-2, and PK-4 to perform a predetermined process.

Figure 7:
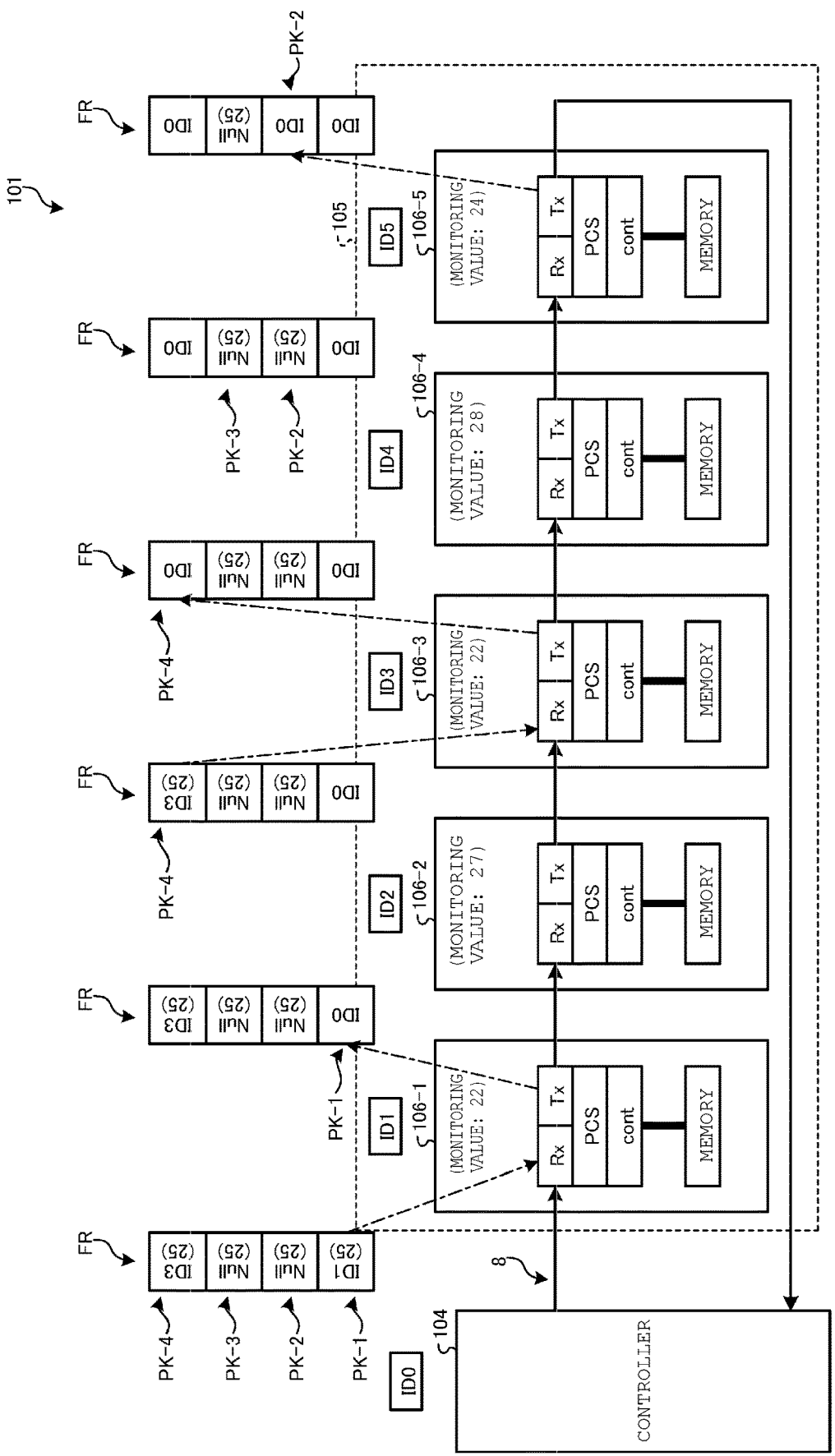
FIG. 7 is a diagram illustrating another operation of the communication system according to the second embodiment.

For example, a use case illustrated in FIG. 7 can be considered. FIG. 7 is a diagram illustrating an operation of the communication system 101. The controller 104 determines the threshold value with respect to the transmission amount per unit time to 25 [%] in accordance with the current communication environment (for example, in accordance with the higher communication traffic compared to FIG. 6). The controller 104 creates a communication frame FR in which the headers H for the two packets PK-1 and PK-4 include the identification information ID1 and ID3 as the transmission destination and information about the threshold value of 25 [%], and the corresponding payloads P include the information desired to be transmitted to the device 106, and the headers H for the two packets PK-2 and PK-3 include information about the threshold value of 25 [%] and are empty (Null) for other parts, and the payloads P are empty (Null). The controller 104 transmits the created communication frame FR to the communication channel 8.

When the device 106-1 receives the communication frame FR via the communication channel 8 from the controller 104, the device 106-1 checks the header H of each packet PK included in the received communication frame FR. As a result of the confirmation, the device 106-1 acquires the information about the threshold value of 25 [%]. At the same time, as a result of the confirmation, the device 106-1 recognizes that, for example, the transmission destination of the packet PK-1 is its ID (ID1), and extracts information from the packet PK-1. The device 106-1 monitors the amount of transmission per unit time and obtains a monitoring value of 22 [%]. The device 106-1 compares the monitoring value of 22 [%] with the threshold value of 25 [%] and determines that the transmission authority is given because the monitoring value of 22 [%] is equal to or less than the threshold value of 25 [%]. Since the transmission authority is given, the device 106-1 is capable of inserting the information into the packet PK-1 when there is information desired to be transmitted to the controller 104. The device 106-1 updates the communication frame FR by rewriting the transmission destination of the header H of the packet PK-1 to ID0, rewriting the transmission source to its ID (ID1), and including in the payload P the information that is desired to be transmitted. The device 106-1 transmits the updated communication frame FR to the communication channel 8.

When the device 106-2 receives the communication frame FR via the communication channel 8 from the device 106-1, the device 106-2 checks the header H of each packet PK included in the received communication frame FR. As a result of the confirmation, the device 106-2 acquires the information about the threshold value of 25 [%]. At the same time, as a result of the confirmation, the device 106-2 recognizes that the packet whose transmission destination is its ID (ID2) does not exist. The device 106-2 monitors the amount of transmission per unit time and obtains a monitoring value of 27 [%]. The device 106-2 compares the monitoring value of 27 [%] with the threshold value of 25 [%] and determines that the transmission authority is not given because the monitoring value of 27 [%] exceeds the threshold value of 25 [%]. In accordance with this, the device 106-2 transmits the communication frame FR to the communication channel 8 without updating the communication frame FR even when there is information desired to be transmitted.

When the device 106-3 receives the communication frame FR via the communication channel 8 from the device 106-2, the device 106-3 checks the header H of each packet PK included in the received communication frame FR. As a result of the confirmation, the device 106-3 acquires the information about the threshold value of 25 [%]. At the same time, as a result of the confirmation, the device 106-3 recognizes that, for example, the transmission destination of the packet PK-4 is its ID (ID3), and extracts information from the packet PK-4. The device 106-3 monitors the amount of transmission per unit time and obtains a monitoring value of 22 [%]. The device 106-3 compares the monitoring value of 22 [%] with the threshold value of 25 [%] and determines that the transmission authority is given because the monitoring value of 22 [%] is equal to or less than the threshold value of 25 [%]. Since the transmission authority is given, the device 106-3 is capable of inserting the information into the packet PK-4 when there is information desired to be transmitted to the controller 104. The device 106-3 updates the communication frame FR by rewriting the transmission destination of the header H of the packet PK-4 to ID0, rewriting the transmission source to its ID (ID3), and including in the payload P the information that is desired to be transmitted. The device 106-3 transmits the updated communication frame FR to the communication channel 8.

When the device 106-4 receives the communication frame FR via the communication channel 8 from the device 106-3, the device 106-4 checks the header H of each packet PK included in the received communication frame FR. As a result of the confirmation, the device 106-4 acquires the information about the threshold value of 25 [%]. At the same time, as a result of the confirmation, the device 106-4 recognizes that the packet whose transmission destination is its ID (ID4) does not exist. The device 106-4 monitors the amount of transmission per unit time and obtains a monitoring value of 28 [%]. The device 106-4 compares the monitoring value of 28 [%] with the threshold value of 25 [%] and determines that the transmission authority is not given because the monitoring value of 28 [%] exceeds the threshold value of 25 [%]. In accordance with this, the device 106-4 transmits the communication frame FR to the communication channel 8 without updating the communication frame FR even when there is information desired to be transmitted.

When the device 106-5 receives the communication frame FR via the communication channel 8 from the device 106-4, the device 106-5 checks the header H of each packet PK included in the received communication frame FR. As a result of the confirmation, the device 106-5 acquires the information about the threshold value of 25 [%]. At the same time, as a result of the confirmation, the device 106-5 recognizes that the packet whose transmission destination is its ID (ID5) does not exist. The device 106-5 monitors the amount of transmission per unit time and obtains a monitoring value of 24 [%]. The device 106-5 compares the monitoring value of 24 [%] with the threshold value of 25 [%] and determines that the transmission authority is given because the monitoring value of 24 [%] is equal to or less than the threshold value of 25 [%]. Since the transmission authority is given, the device 106-5 is capable of inserting the information into any of the null packets PK-2 to PK-3 when there is information desired to be transmitted to the controller 104. The device 106-5 updates the communication frame FR by rewriting the transmission destination of the header H of the packet PK-2 to ID0, rewriting the transmission source to its ID (ID5), and including in the payload P the information that is desired to be transmitted. The device 106-5 transmits the updated communication frame FR to the communication channel 8.

When the controller 104 receives the updated communication frame FR via the communication channel 8 from the device 106-5, the controller 104 checks the header H of each packet PK included in the received communication frame FR. According to the confirmation results, the controller 104 recognizes that the packets PK-1, PK-2, and PK-4 among the plurality of packets PK-1 to PK-4 included in the communication frame FR are not null packets. In accordance with this, the controller 104 performs a predetermined reception process with respect to the packets PK-1, PK-2, and PK-4, and extracts the information included in the payloads P of the packets PK-1, PK-2, and PK-4 to perform a predetermined process.

As described above, in the second embodiment, the controller 104 transmits the packet PK, in which the information of the threshold value $A_{th}$ in accordance with the communication environment is set and included in the header H, and each device 106 checks the header H of the packet PK and acquires the threshold value $A_{th}$. Since the threshold value $A_{th}$ for bandwidth restriction can be changed dynamically, the communication system 1 can appropriately apply the bandwidth restrictions with respect to the transmission amount per unit time of each device 106 in accordance with the current communication environment. As a result, the communication system 101 can efficiently improve the performance in accordance with the communication environment.

Third Embodiment

Next, the communication system 201 according to a third embodiment will be described. In the following, the parts different from the first embodiment and the second embodiment will be mainly described.

In the first embodiment and the second embodiment, the bandwidth restriction is used to prevent the situation where there may be no packet that is capable of inserting the information desired to be transmitted by the device on the downstream side of the communication channel among the plurality of ring-connected devices. In the third embodiment, such a situation is prevented by a priority control in consideration of the priority of information instead of bandwidth restriction.

Figure 8:
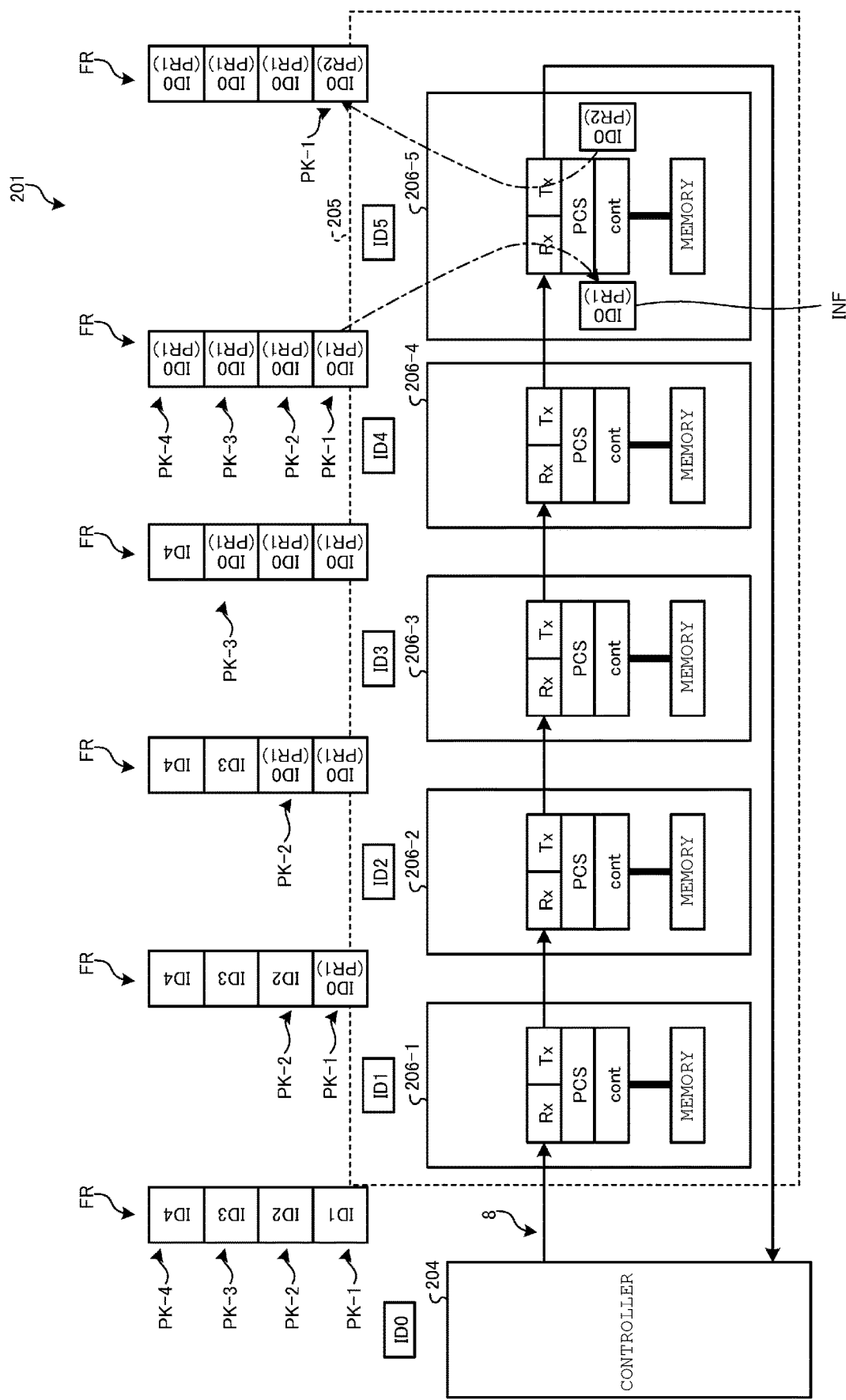
FIG. 8 is a diagram illustrating a configuration and operation of a communication system according to a third embodiment.

Specifically, as illustrated in FIG. 8, in the communication system 201, each memory card 205 has, for example, five devices 206 (206-1 to 206-5). FIG. 8 is a diagram illustrating a configuration and operation of the communication system 201 according to the third embodiment. The five devices 206-1 to 206-5 are ring-connected to the controller 204 via the communication channel 8. The communication frame FR includes four packets PK-1 to PK-4 (see FIG. 3). The number of ring-connected devices (5) is larger than the number of packets included in the communication frame FR (4).

When a packet whose transmission destination is its ID exists in the received communication frame FR, each device 206 can insert and extract information into and from the packet. When inserting information into the payload P of the packet PK, each device 206 updates the communication frame FR by including the information that indicates the priority of the information in the header H of the packet PK and transmits the updated communication frame FR to the communication channel 8.

When there is no packet whose transmission destination is its ID in the received communication frame FR and there is no null packet in the communication frame FR, each device 206 checks whether a packet having a priority exists in the communication frame FR. When the header includes the information indicating the priority of the information stored in the payload in the packet included in the received communication frame FR, depending on a condition that the priority of the information to be transmitted is higher than the priority of the information in the payload, each device 206 replaces the packet included in the received communication frame FR with a packet in which the priority of the information to be transmitted is stored in the payload and the priority is stored in the header.

That is, when the information that indicates the priority is included in the headers H of at least a part of the packets PK in the received communication frame FR, each device 206 compares the priority thereof with the priority of the information desired to be transmitted by the own device. When the priority of each device 206 is lower than the priority of the information desired to be transmitted by the own device, each device 206 extracts the header H and the payload P of the packet PK and maintains the header H and the payload P as they are. At the same time, each device 206 updates the communication frame FR by rewriting the transmission destination of the header H of the packet PK to the ID of the controller 204, rewriting the transmission source to its ID, including information indicating the priority in the header H, and including the information desired to be transmitted in the payload P of the packet PK, and transmits the updated communication frame FR to the communication channel 8.

For example, a use case illustrated in FIG. 8 can be considered. In the communication system 201, the identification information of the controller 204, the device 206-1, the device 206-2, the device 206-3, the device 206-4, and the device 206-5 are defined as ID0, ID1, ID2, ID3, ID4, and ID5, respectively. The controller 204 creates a communication frame FR in which the headers H of the four packets PK-1, PK-2, PK-3, and PK-4 include the identification information ID1, ID2, ID3, and ID4 of the transmission destination, and the payloads P include the information desired to be transmitted to the device 206. The controller 204 transmits the created communication frame FR to the communication channel 8.

When the device 206-1 receives the communication frame FR via the communication channel 8 from the controller 204, the device 206-1 checks the header H of each packet PK included in the received communication frame FR. As a result of the confirmation, the device 206-1 recognizes that the transmission destination of the packet PK-1 is its ID (ID1), and extracts information from the packet PK-1. When there is information desired to be transmitted to the controller 204, the device 206-1 updates the communication frame FR by rewriting the transmission destination of the header H of the packet PK-1 to the controller 204 (ID0), rewriting the transmission source to its ID (ID1), including the information of priority PR1 in the header H, and including the information desired to be transmitted in the payload P. The priority PR1 is a priority assigned to the usual information. The device 206-1 transmits the updated communication frame FR to the communication channel 8.

When the device 206-2 receives the communication frame FR via the communication channel 8 from the device 206-1, the device 206-2 checks the header H of each packet PK included in the received communication frame FR. As a result of the confirmation, the device 206-2 recognizes that the transmission destination of the packet PK-2 is its ID (ID2), and extracts information from the packet PK-2. When there is information desired to be transmitted to the controller 204, the device 206-2 updates the communication frame FR by rewriting the transmission destination of the header H of the packet PK-2 to the controller 204 (ID0), rewriting the transmission source to its ID (ID2), including the information of priority PR1 in the header H, and including the information desired to be transmitted in the payload P. The device 206-2 transmits the updated communication frame FR to the communication channel 8.

When the device 206-3 receives the communication frame FR via the communication channel 8 from the device 206-2, the device 206-3 checks the header H of each packet PK included in the received communication frame FR. As a result of the confirmation, the device 206-3 recognizes that the transmission destination of the packet PK-3 is its ID (ID3), and extracts information from the packet PK-3. When there is information desired to be transmitted to the controller 204, the device 206-3 updates the communication frame FR by rewriting the transmission destination of the header H of the packet PK-3 to the controller 204 (ID0), rewriting the transmission source to its ID (ID3), including the information of priority PR1 in the header H, and including the information desired to be transmitted in the payload P. The device 206-3 transmits the updated communication frame FR to the communication channel 8.

When the device 206-4 receives the communication frame FR via the communication channel 8 from the device 206-3, the device 206-4 checks the header H of each packet PK included in the received communication frame FR. As a result of the confirmation, the device 206-4 recognizes that the transmission destination of the packet PK-4 is its ID (ID4), and extracts information from the packet PK-4. When there is information desired to be transmitted to the controller 204, the device 206-4 updates the communication frame FR by rewriting the transmission destination of the header H of the packet PK-4 to the controller 204 (ID0), rewriting the transmission source to its ID (ID4), including the information of priority PR1 in the header H, and including the information desired to be transmitted in the payload P. The device 206-4 transmits the updated communication frame FR to the communication channel 8.

When the device 206-5 receives the communication frame FR via the communication channel 8 from the device 206-4, the device 206-5 checks the header H of each packet PK included in the received communication frame FR. As a result of the confirmation, the device 206-5 recognizes that there is no packet whose transmission destination is its ID (ID5) in the communication frame FR and that there is no null packet in the communication frame FR. When there is information desired to be transmitted to the controller 204, the device 206-5 checks whether a packet having a priority exists in the communication frame FR. As a result of confirmation, the devices 206-5 recognize that each of the priorities of the packets PK-1 to PK-4 is PR1. The device 206-5 determines that the priority of the information it desires to transmit is PR2.

The priority PR2 is a higher priority than a normal priority and is assigned to urgent information. The urgent information may be, for example, information to be transmitted in accordance with a retransmission request from the controller 204, or information regarding an abnormality detected in the device and should be notified to the controller 204.

The device 206-5 compares the priority PR1 and the priority PR2 . Since the priority PR1 is lower than the priority PR2, the device 206-5 extracts the information INF of the header H and the payload P of the packet PK-1 and maintains the information INF in the device as it is. Regarding the header H in the information INF, information indicating that the transmission destination is the controller 204 (ID0), information indicating that the transmission source is the device 206-1 (ID1), and information that indicates the priority PR1 are included. Regarding the payload P in the information INF, information that is desired to be transmitted by the device 206-1 to the controller 204 is included.

At the same time, the device 206-5 updates the communication frame FR by rewriting the transmission destination of the header H of the packet PK-1 to the ID0, rewriting the transmission source to its ID (ID 5), including information indicating the priority PR2 in the header H of the packet PK-1, and including the information it desires to transmit in the payload P of the packet PK-1, and transmits the updated communication frame FR to the communication channel 8.

When the controller 204 receives the updated communication frame FR via the communication channel 8 from the device 206-5, the controller 204 checks the header H of each packet PK included in the received communication frame FR. According to the confirmation results, the controller 204 performs a predetermined reception process with respect to each of the packets PK-1 to PK-4 included in the communication frame FR, and extracts the information included in the payload P of each of the packets PK-1 to PK-4 to perform a predetermined process.

Figure 9:
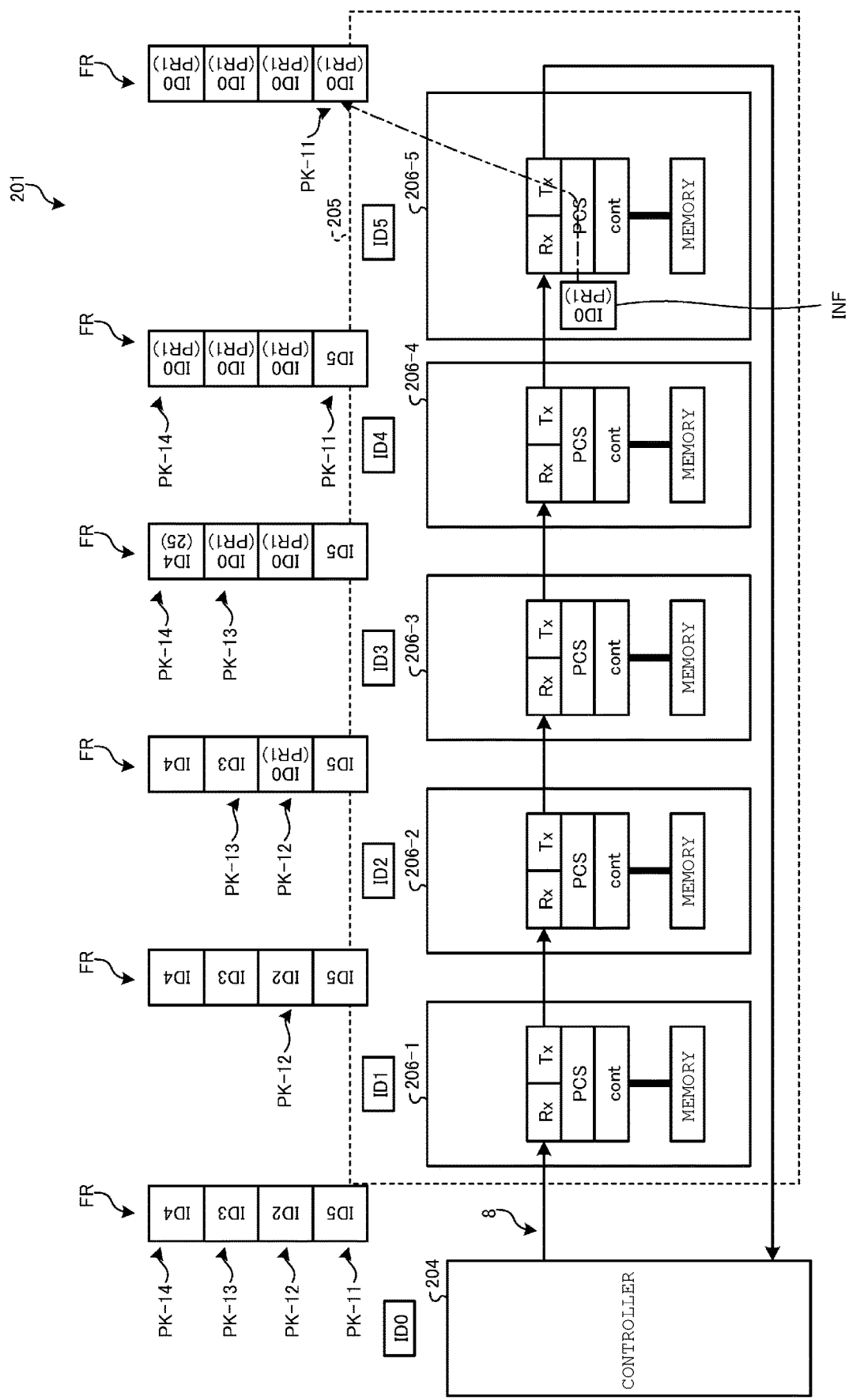
FIG. 9 is a diagram illustrating another operation of the communication system according to the third embodiment.

According to the confirmation results, the controller 204 recognizes that the packet PK-1 among the plurality of packets PK-1 to PK-4 included in the communication frame FR is a packet having a higher priority than usual. In accordance with this, as illustrated in FIG. 9, it is assumed that the device 206-5 may maintain the information of another device that is not transmitted, the controller 204 creates a communication frame FR in which the identification information ID 5 is designated as the transmission destination in the header H of one packet PK (for example, packet PK-3). FIG. 9 is a diagram illustrating an operation of the communication system 201. The controller 204 creates a communication frame FR in which the headers H of the four packets PK-11, PK-12, PK-13, and PK-14 include the identification information ID5, ID2, ID3, and ID4 of the transmission destination, and the payloads P include the information desired to be transmitted to the device 206. Regarding the packet PK-11 whose transmission destination is the device 206-5 (ID5), the payload P may include dummy information when there is no information desired to be transmitted to the device 206-5. The controller 204 transmits the created communication frame FR to the communication channel 8.

When the device 206-1 receives the communication frame FR via the communication channel 8 from the controller 204, the device 206-1 checks the header H of each packet PK included in the received communication frame FR. As a result of the confirmation, the device 206-1 recognizes that there is no packet whose transmission destination is its ID (ID1) in the communication frame FR and that there is no null packet in the communication frame FR. When there is information desired to be transmitted to the controller 204, the device 206-1 checks whether a packet having a priority exists in the communication frame FR. As a result of the confirmation, the device 206-1 recognizes that there is no packet. In accordance with this, the device 206-1 transmits the communication frame FR to the communication channel 8 without updating the communication frame FR even when there is information desired to be transmitted.

When the device 206-2 receives the communication frame FR via the communication channel 8 from the device 206-1, the device 206-2 checks the header H of each packet PK included in the received communication frame FR. As a result of the confirmation, the device 206-2 recognizes that the transmission destination of the packet PK-12 is its ID (ID2), and extracts information from the packet PK-12. When there is information desired to be transmitted to the controller 204, the device 206-2 updates the communication frame FR by rewriting the transmission destination of the header H of the packet PK-12 to the controller 204 (ID0), rewriting the transmission source to its ID (ID2), including the information of priority PR1 in the header H, and including the information desired to be transmitted in the payload P. The device 206-2 transmits the updated communication frame FR to the communication channel 8.

When the device 206-3 receives the communication frame FR via the communication channel 8 from the device 206-2, the device 206-3 checks the header H of each packet PK included in the received communication frame FR. As a result of the confirmation, the device 206-3 recognizes that the transmission destination of the packet PK-13 is its ID (ID3), and extracts information from the packet PK-13. When there is information desired to be transmitted to the controller 204, the device 206-3 updates the communication frame FR by rewriting the transmission destination of the header H of the packet PK-13 to the controller 204 (ID0), rewriting the transmission source to its ID (ID3), including the information of priority PR1 in the header H, and including the information desired to be transmitted in the payload P. The device 206-3 transmits the updated communication frame FR to the communication channel 8.

When the device 206-4 receives the communication frame FR via the communication channel 8 from the device 206-3, the device 206-4 checks the header H of each packet PK included in the received communication frame FR. As a result of the confirmation, the device 206-4 recognizes that the transmission destination of the packet PK-14 is its ID (ID4), and extracts information from the packet PK-14. When there is information desired to be transmitted to the controller 204, the device 206-4 updates the communication frame FR by rewriting the transmission destination of the header H of the packet PK-14 to the controller 204 (ID0), rewriting the transmission source to its ID (ID4), including the information of priority PR1 in the header H, and including the information desired to be transmitted in the payload P. The device 206-4 transmits the updated communication frame FR to the communication channel 8.

When the device 206-5 receives the communication frame FR via the communication channel 8 from the device 206-4, the device 206-5 checks the header H of each packet PK included in the received communication frame FR. As a result of the confirmation, the device 206-5 recognizes that the transmission destination of the packet PK-11 is its ID (ID5), and extracts information from the packet PK-11. When the extracted information is dummy information, the device 206-5 may discard the information. Since the device 206-5 has the maintaining information INF, even when there is information desired to be transmitted, the device 206-5 preferentially inserts the maintaining information INF into the packet PK-11. The device 206-5 updates the communication frame FR by rewriting the header H of the packet PK-11 with the header H in the information INF and rewriting the payload P of the packet PK-11 with the payload P in the information INF. The device 206-5 transmits the updated communication frame FR to the communication channel 8.

When the controller 204 receives the updated communication frame FR via the communication channel 8 from the device 206-5, the controller 204 checks the header H of each packet PK included in the received communication frame FR. According to the confirmation results, the controller 204 performs a predetermined reception process with respect to each of the packets PK-11 to PK-14 included in the communication frame FR, and extracts the information included in the payload P of each of the packets PK-11 to PK-14 to perform a predetermined process.

As described above, in the third embodiment, when the received communication frame FR includes a packet PK having a priority lower than the priority of the information desired to be transmitted by the own device, each device 206 transmits to the controller 204 a packet PK including the information desired to be transmitted and the priority thereof, instead of the information of the packet PK. Thereby, when the number of ring-connected devices 206 (for example, 5) is larger than the number of packets included in the communication frame FR (for example, 4), the device 206 on the downstream side of the ring connection can transmit high-priority information in place of low-priority information. As a result, the bandwidth can be guaranteed for the high-priority information, and the packet transfer in the communication system 201 can be optimized.

In the use case illustrated in FIG. 8, the device 206-5 may discard the information INF and not maintain the information INF. In this case, the controller 204 may issue a retransmission request to the device 206-1 depending on a condition that the information INF to be received from the device 206-1 not being received for a predetermined time. As a result, when the information INF is discarded by the device 206-5, the information INF can be reliably retransmitted from the device 206-1 to the controller 204.

Fourth Embodiment

Next, the communication system 301 according to a fourth embodiment will be described. In the following, the parts different from the first embodiment to the third embodiment will be mainly described.

In the fourth embodiment, the first embodiment and the third embodiment are combined. In a communication system, as a general rule, a priority control is performed in consideration of priority as an exception while a bandwidth restriction using a fixed threshold value is normally performed.

Figure 10:
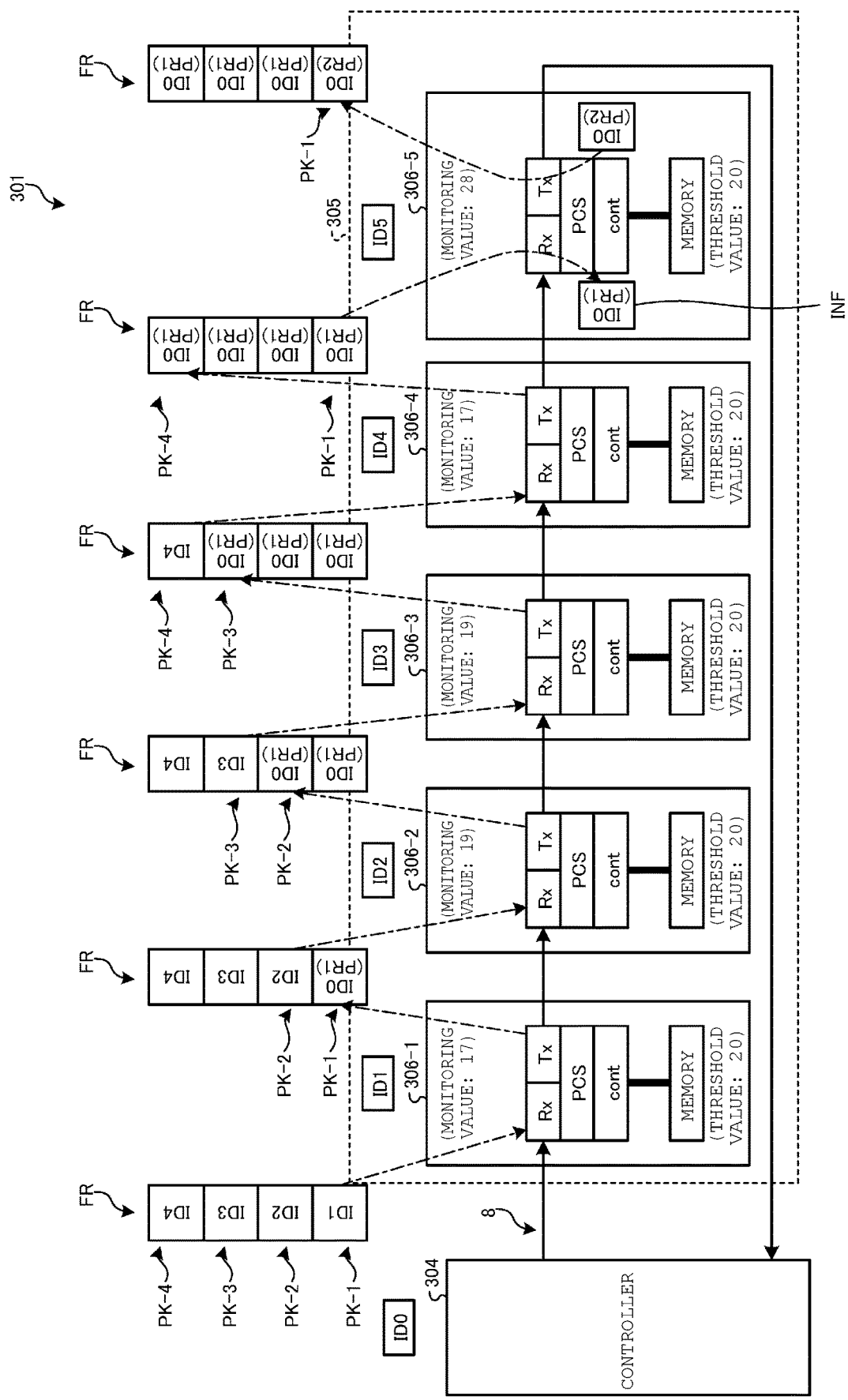
FIG. 10 is a diagram illustrating a configuration and operation of a communication system according to a fourth embodiment.

Specifically, as illustrated in FIG. 10, in the communication system 301, each memory card 305 has, for example, five devices 306 (306-1 to 306-5). FIG. 10 is a diagram illustrating the configuration and operation of the communication system 301 according to the fourth embodiment. The five devices 306-1 to 306-5 are ring-connected to the controller 304 via the communication channel 8. The communication frame FR includes four packets PK-1 to PK-4 (see FIG. 3). The number of ring-connected devices (5) is larger than the number of packets included in the communication frame FR (4).

Each device 306 has a bandwidth restriction on the amount of data transmitted per unit time. A threshold value $A_{th}$ for the amount of transmission per unit time is set in advance in each device 306. Each device 306 monitors the transmission amount per unit time, $A_6$, for each predetermined cycle. Each device 306 compares $A_6$ with the threshold value $A_{th}$.

When $A_6$ is equal to or less than the threshold value $A_{th}$, the transmission authority is given to each device 306, and each device 306 can insert predetermined information into the packet PK.

When $A_6$ of each device 306 exceeds the threshold value $A_{th}$, the transmission authority is not given to the device as a default. The device then checks whether a packet having a priority lower than the priority of the information it desires to transmit exists in the communication frame FR. When there is a packet having a priority lower than the priority of the information it desires to transmit, the transmission authority is given to the device as an exception. In accordance with this, the device replaces the packet having a low priority with the packet in which the information it desires to transmit is stored in the payload and the priority is stored in the header. That is, the device extracts the header H and the payload P of the packet PK and maintains the header H and payload P as they are. At the same time, the device updates the communication frame FR by including the information indicating the priority in the header H of the packet PK and including the information it desires to transmit in the payload P of the packet PK, and transmits the updated communication frame FR to the communication channel 8.

For example, the use case illustrated in FIG. 10 can be considered. In the communication system 301, the identification information of the controller 304, the device 306-1, the device 306-2, the device 306-3, the device 306-4, and the device 306-5 are defined as ID0, ID1, ID2, ID3, ID4, and ID5, respectively. In each of the devices 306-1 to 306-5, 20 [%] is set in advance as a threshold value with respect to the transmission amount per unit time. The controller 304 creates a communication frame FR in which the headers H of the four packets PK-1, PK-2, PK-3, and PK-4 include the identification information ID1, ID2, ID3, and ID4 of the transmission destination, and the payloads P include the information desired to be transmitted to the device 306. The controller 304 transmits the created communication frame FR to the communication channel 8.

When the device 306-1 receives the communication frame FR via the communication channel 8 from the controller 304, the device 306-1 checks the header H of each packet PK included in the received communication frame FR. As a result of the confirmation, the device 306-1 recognizes that the transmission destination of the packet PK-1 is its ID (ID1), and extracts information from the packet PK-1. The device 306-1 monitors the amount of transmission per unit time and obtains a monitoring value of 17 [%]. The device 306-1 compares the monitoring value of 17 [%] with the threshold value of 20 [%] and determines that the transmission authority is given because the monitoring value of 17 [%] is equal to or less than the threshold value of 20 [%]. Since the transmission authority is given, when there is information desired to be transmitted to controller 304, the device 306-1 updates the communication frame FR by rewriting the transmission destination of the header H of the packet PK-1 to ID0, rewriting the transmission source to its ID (ID1), and including the information desired to be transmitted in the payload P. The device 306-1 transmits the updated communication frame FR to the communication channel 8.

When the device 306-2 receives the communication frame FR via the communication channel 8 from the device 306-1, the device 306-2 checks the header H of each packet PK included in the received communication frame FR. As a result of the confirmation, the device 306-2 recognizes that the transmission destination of the packet PK-2 is its ID (ID2), and extracts information from the packet PK-2. The device 306-2 monitors the amount of transmission per unit time and obtains a monitoring value of 19 [%]. The device 306-2 compares the monitoring value of 19 [%] with the threshold value of 20 [%] and determines that the transmission authority is given because the monitoring value of 19 [%] is equal to or less than the threshold value of 20 [%]. Since the transmission authority is given, when there is information desired to be transmitted to controller 304, the device 306-2 updates the communication frame FR by rewriting the transmission destination of the header H of the packet PK-2 to ID0, rewriting the transmission source to its ID (ID2), and including the information desired to be transmitted in the payload P. The device 306-2 transmits the updated communication frame FR to the communication channel 8.

When the device 306-3 receives the communication frame FR via the communication channel 8 from the device 306-2, the device 306-3 checks the header H of each packet PK included in the received communication frame FR. As a result of the confirmation, the device 306-3 recognizes that the transmission destination of the packet PK-3 is its ID (ID3), and extracts information from the packet PK-3. The device 306-3 monitors the amount of transmission per unit time and obtains a monitoring value of 19 [%]. The device 306-3 compares the monitoring value of 19 [%] with the threshold value of 20 [%] and determines that the transmission authority is given because the monitoring value of 19 [%] is equal to or less than the threshold value of 20 [%]. Since the transmission authority is given, when there is information desired to be transmitted to controller 304, the device 306-3 updates the communication frame FR by rewriting the transmission destination of the header H of the packet PK-3 to ID0, rewriting the transmission source to its ID (ID3), and including the information desired to be transmitted in the payload P. The device 306-3 transmits the updated communication frame FR to the communication channel 8.

When the device 306-4 receives the communication frame FR via the communication channel 8 from the device 306-3, the device 306-4 checks the header H of each packet PK included in the received communication frame FR. As a result of the confirmation, the device 306-4 recognizes that the transmission destination of the packet PK-4 is its ID (ID4), and extracts information from the packet PK-4. The device 306-4 monitors the amount of transmission per unit time and obtains a monitoring value of 17 [%]. The device 306-4 compares the monitoring value of 17 [%] with the threshold value of 20 [%] and determines that the transmission authority is given because the monitoring value of 17 [%] is equal to or less than the threshold value of 20 [%]. Since the transmission authority is given, when there is information desired to be transmitted to controller 304, the device 306-4 updates the communication frame FR by rewriting the transmission destination of the header H of the packet PK-4 to ID0, rewriting the transmission source to its ID (ID4), and including the information desired to be transmitted in the payload P. The device 306-4 transmits the updated communication frame FR to the communication channel 8.

When the device 306-5 receives the communication frame FR via the communication channel 8 from the device 306-4, the device 306-5 checks the header H of each packet PK included in the received communication frame FR. As a result of the confirmation, the device 306-5 recognizes that there is no packet whose transmission destination is its ID (ID5) in the communication frame FR and that there is no null packet in the communication frame FR. The device 306-5 monitors the amount of transmission per unit time and obtains a monitoring value of 28 [%]. The device 306-5 compares the monitoring value of 28 [%] with the threshold value of 20 [%] and determines that the transmission authority is not given because the monitoring value of 28 [%] exceeds the threshold value of 20 [%] as a default.

When there is information desired to be transmitted to the controller 304, the device 306-5 checks whether a packet having a low priority exists in the communication frame FR. As a result of confirmation, since the priority PR1 of the packets PK-1 to PK-4 is lower than the priority PR2 of the information it desires to transmit, the transmission authority is given to the device 306-5 as an exception. In accordance with this, the device 306-5 extracts the information INF of the header H and the payload P of the packet PK-1 and maintains the information INF as it is. Regarding the header H in the information INF, information indicating that the transmission destination is the controller 304 (ID0), information indicating that the transmission source is the device 306-1 (ID1), and information that indicates the priority PR1 are included. Regarding the payload P in the information INF, information that is desired to be transmitted by the device 306-1 to the controller 304 is included.

At the same time, the device 306-5 updates the communication frame FR by rewriting the transmission destination of the header H of the packet PK-1 to the ID0, rewriting the transmission source to its ID (ID 5), including information indicating the priority PR2 in the header H of the packet PK-1, and including the information it desires to transmit in the payload P of the packet PK-1, and transmits the updated communication frame FR to the communication channel 8.

When the controller 304 receives the updated communication frame FR via the communication channel 8 from the device 306-5, the controller 304 checks the header H of each packet PK included in the received communication frame FR. According to the confirmation results, the controller 304 performs a predetermined reception process with respect to each of the packets PK-1 to PK-4 included in the communication frame FR, and extracts the information included in the payload P of each of the packets PK-1 to PK-4 to perform a predetermined process.

After that, an operation that combines the operation illustrated in FIG. 2 and the operation illustrated in FIG. 9 is performed.

As described above, in the fourth embodiment, in a communication system 301, as a general rule, a priority control is performed in consideration of priority as an exception while a bandwidth restriction using a fixed threshold value is normally performed. As a result, the transmission authority of each device 306 can be guaranteed evenly over time, and the bandwidth can be guaranteed for high-priority information. As a result, the packet transfer in the communication system 301 can be optimized.

Fifth Embodiment

Next, the communication system 401 according to a fifth embodiment will be described. In the following, the parts different from the first embodiment to the fourth embodiment will be mainly described.

In the fifth embodiment, the second embodiment and the third embodiment are combined. In a communication system, as a general rule, a priority control is performed in consideration of priority as exception while a bandwidth restriction using a dynamic threshold value is normally performed.

Figure 11:
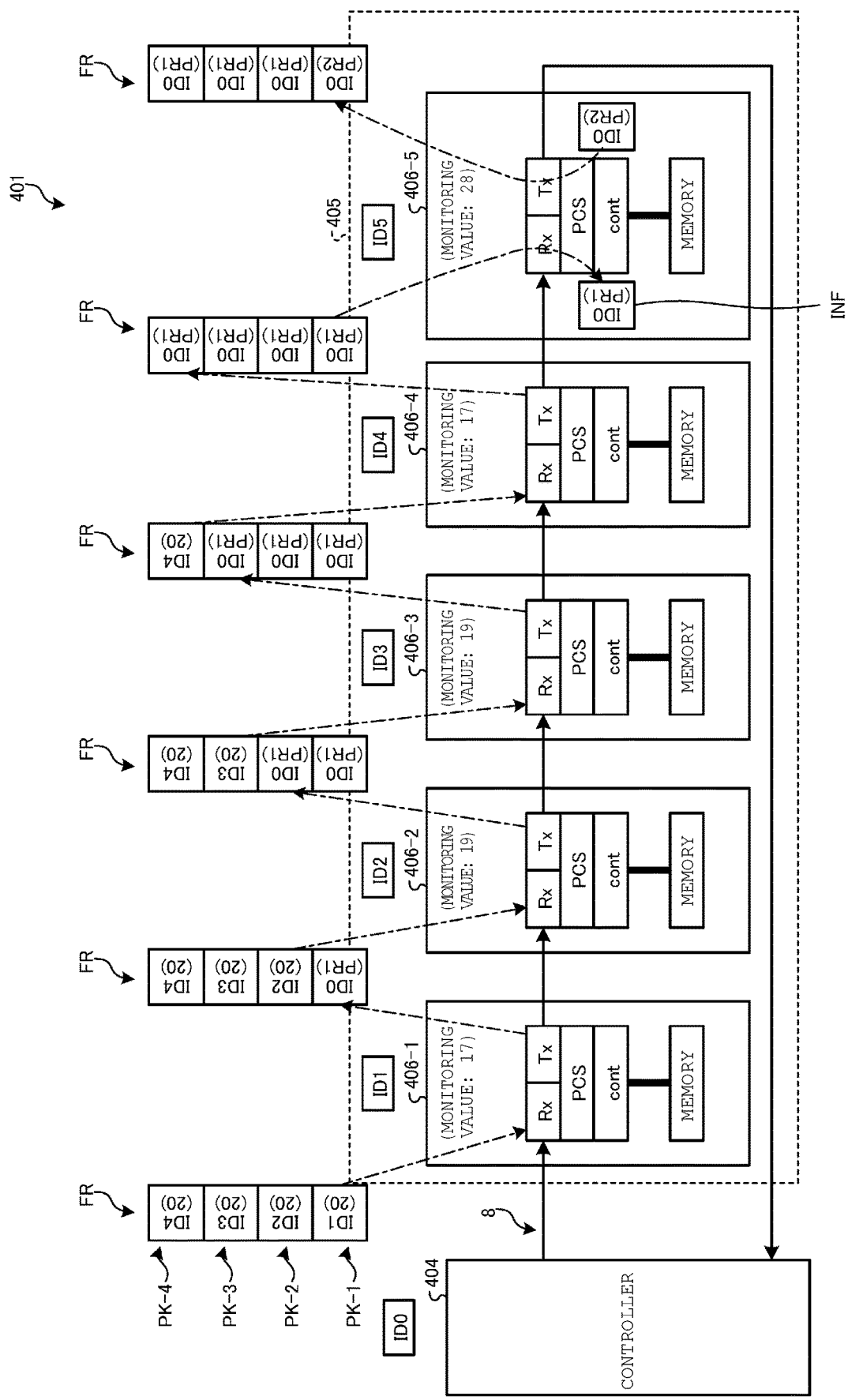
FIG. 11 is a diagram illustrating a configuration and operation of a communication system according to a fifth embodiment.

Specifically, as illustrated in FIG. 11, in the communication system 401, each memory card 405 has, for example, five devices 406 (406-1 to 406-5). FIG. 11 is a diagram illustrating a configuration and operation of the communication system 401 according to the fifth embodiment. The five devices 406-1 to 406-5 are ring-connected to the controller 404 via the communication channel 8. The communication frame FR includes four packets PK-1 to PK-4 (see FIG. 3). The number of ring-connected devices (5) is larger than the number of packets included in the communication frame FR (4).

Each device 406 has a bandwidth restriction on the amount of data transmitted per unit time. The controller 404 creates a communication frame FR such that the header H of each packet PK includes information indicating the threshold value, and transmits the communication frame FR to the communication channel 8. Each device 406 acquires the threshold value $A_{th}$ in accordance with the information stored in the header H in the packet PK included in the received communication frame FR.

Each device 406 monitors the transmission amount per unit time, $A_6$, for each predetermined cycle. Each device 406 compares $A_6$ with the threshold value $A_{th}$.

When $A_6$ is equal to or less than the threshold value $A_{th}$, the transmission authority is given to each device 406, and each device 406 can insert predetermined information into the packet PK.

When $A_6$ of each device 406 exceeds the threshold value $A_{th}$, the transmission authority is not given to the device as a default. The device then checks whether a packet having a priority lower than the priority of the information it desires to transmit exists in the communication frame FR. When there is a packet having a priority lower than the priority of the information it desires to transmit, the transmission authority is given to the device as an exception. In accordance with this, the device replaces the packet having a low priority with the packet in which the information it desires to transmit is stored in the payload and the priority is stored in the header. That is, the device extracts the header H and the payload P of the packet PK and maintains the header H and payload P as they are. At the same time, the device updates the communication frame FR by including the information indicating the priority in the header H of the packet PK and including the information it desires to transmit in the payload P of the packet PK, and transmits the updated communication frame FR to the communication channel 8.

For example, the use case illustrated in FIG. 11 can be considered. In the communication system 401, the identification information of the controller 404, the device 406-1, the device 406-2, the device 406-3, the device 406-4, and the device 406-5 are defined as ID0, ID1, ID2, ID3, ID4, and ID5, respectively. In each of the devices 406-1 to 406-5, 20 [%] is set in advance as a threshold value with respect to the transmission amount per unit time. The controller 404 creates a communication frame FR in which the headers H of the four packets PK-1, PK-2, PK-3, and PK-4 include the identification information ID1, ID2, ID3, and ID4 of the transmission destination, and the payloads P include the information desired to be transmitted to the device 406. The controller 404 transmits the created communication frame FR to the communication channel 8.

When the device 406-1 receives the communication frame FR via the communication channel 8 from the controller 404, the device 406-1 checks the header H of each packet PK included in the received communication frame FR. As a result of the confirmation, the device 406-1 acquires the information about the threshold value of 20 [%]. At the same time, as a result of the confirmation, the device 406-1 recognizes that the transmission destination of the packet PK-1 is its ID (ID1), and extracts information from the packet PK-1. The device 406-1 monitors the amount of transmission per unit time and obtains a monitoring value of 17 [%]. The device 406-1 compares the monitoring value of 17 [%] with the threshold value of 20 [%] and determines that the transmission authority is given because the monitoring value of 17 [%] is equal to or less than the threshold value of 20 [%]. Since the transmission authority is given, when there is information desired to be transmitted to controller 404, the device 406-1 updates the communication frame FR by rewriting the transmission destination of the header H of the packet PK-1 to ID0, rewriting the transmission source to its ID (ID1), and including the information desired to be transmitted in the payload P. The device 406-1 transmits the updated communication frame FR to the communication channel 8.

When the device 406-2 receives the communication frame FR via the communication channel 8 from the device 406-1, the device 406-2 checks the header H of each packet PK included in the received communication frame FR. As a result of the confirmation, the device 406-2 acquires the information about the threshold value of 20 [%]. At the same time, as a result of the confirmation, the device 406-2 recognizes that the transmission destination of the packet PK-2 is its ID (ID2), and extracts information from the packet PK-2. The device 406-2 monitors the amount of transmission per unit time and obtains a monitoring value of 19 [%]. The device 406-2 compares the monitoring value of 19 [%] with the threshold value of 20 [%] and determines that the transmission authority is given because the monitoring value of 19 [%] is equal to or less than the threshold value of 20 [%]. Since the transmission authority is given, when there is information desired to be transmitted to controller 404, the device 406-2 updates the communication frame FR by rewriting the transmission destination of the header H of the packet PK-2 to ID0, rewriting the transmission source to its ID (ID2), and including the information desired to be transmitted in the payload P. The device 406-2 transmits the updated communication frame FR to the communication channel 8.

When the device 406-3 receives the communication frame FR via the communication channel 8 from the device 406-2, the device 406-3 checks the header H of each packet PK included in the received communication frame FR. As a result of the confirmation, the device 406-3 acquires the information about the threshold value of 20 [%]. At the same time, as a result of the confirmation, the device 406-3 recognizes that the transmission destination of the packet PK-3 is its ID (ID3), and extracts information from the packet PK-3. The device 406-3 monitors the amount of transmission per unit time and obtains a monitoring value of 19 [%]. The device 406-3 compares the monitoring value of 19 [%] with the threshold value of 20 [%] and determines that the transmission authority is given because the monitoring value of 19 [%] is equal to or less than the threshold value of 20 [%]. Since the transmission authority is given, when there is information desired to be transmitted to controller 404, the device 406-3 updates the communication frame FR by rewriting the transmission destination of the header H of the packet PK-3 to ID0, rewriting the transmission source to its ID (ID3), and including the information desired to be transmitted in the payload P. The device 406-3 transmits the updated communication frame FR to the communication channel 8.

When the device 406-4 receives the communication frame FR via the communication channel 8 from the device 406-3, the device 406-4 checks the header H of each packet PK included in the received communication frame FR. As a result of the confirmation, the device 406-4 acquires the information about the threshold value of 20 [%]. At the same time, as a result of the confirmation, the device 406-4 recognizes that the transmission destination of the packet PK-4 is its ID (ID4), and extracts information from the packet PK-4. The device 406-4 monitors the amount of transmission per unit time and obtains a monitoring value of 17 [%]. The device 406-4 compares the monitoring value of 17 [%] with the threshold value of 20 [%] and determines that the transmission authority is given because the monitoring value of 17 [%] is equal to or less than the threshold value of 20 [%]. Since the transmission authority is given, when there is information desired to be transmitted to controller 404, the device 406-4 updates the communication frame FR by rewriting the transmission destination of the header H of the packet PK-4 to ID0, rewriting the transmission source to its ID (ID4), and including the information desired to be transmitted in the payload P. The device 406-4 transmits the updated communication frame FR to the communication channel 8.

When the device 406-5 receives the communication frame FR via the communication channel 8 from the device 406-4, the device 406-5 checks the header H of each packet PK included in the received communication frame FR. As a result of the confirmation, the device 406-5 acquires the information about the threshold value of 20 [%]. At the same time, as a result of the confirmation, the device 406-5 recognizes that there is no packet whose transmission destination is its ID (ID5) in the communication frame FR and that there is no null packet in the communication frame FR. The device 406-5 monitors the amount of transmission per unit time and obtains a monitoring value of 28 [%]. The device 406-5 compares the monitoring value of 28 [%] with the threshold value of 20 [%] and determines that the transmission authority is not given because the monitoring value of 28 [%] exceeds the threshold value of 20 [%] as a default.

When there is information desired to be transmitted to the controller 404, the device 406-5 checks whether a packet having a low priority exists in the communication frame FR. As a result of confirmation, since the priority PR1 of the packets PK-1 to PK-4 is lower than the priority PR2 of the information it desires to transmit, the transmission authority is given to the device 406-5 as an exception. In accordance with this, the device 406-5 extracts the information INF of the header H and the payload P of the packet PK-1 and maintains the information INF as it is. Regarding the header H in the information INF, information indicating that the transmission destination is the controller 404 (ID0), information indicating that the transmission source is the device 406-1 (ID1), and information that indicates the priority PR1 are included. Regarding the payload P in the information INF, information that is desired to be transmitted by the device 406-1 to the controller 404 is included.

At the same time, the device 406-5 updates the communication frame FR by rewriting the transmission destination of the header H of the packet PK-1 to the ID0, rewriting the transmission source to its ID (ID 5), including information indicating the priority PR2 in the header H of the packet PK-1, and including the information it desires to transmit in the payload P of the packet PK-1, and transmits the updated communication frame FR to the communication channel 8.

When the controller 404 receives the updated communication frame FR via the communication channel 8 from the device 406-5, the controller 404 checks the header H of each packet PK included in the received communication frame FR. According to the confirmation results, the controller 404 performs a predetermined reception process with respect to each of the packets PK-1 to PK-4 included in the communication frame FR, and extracts the information included in the payload P of each of the packets PK-1 to PK-4 to perform a predetermined process.

After that, an operation that combines the operation illustrated in FIG. 6 and the operation illustrated in FIG. 9 is performed.

As described above, in the fifth embodiment, in a communication system 401, as a general rule, a priority control is performed in consideration of priority as an exception while a bandwidth restriction using a dynamic threshold value is normally performed. As a result, the transmission authority of each device 406 can be guaranteed evenly over time, and the bandwidth can be guaranteed for high-priority information. As a result, the packet transfer in the communication system 401 can be optimized.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein maybe made without departing from the spirit of the disclosure. The accompanying claims and their equivalents are intended to cover such forms or modifications as would fall within the scope and spirit of the disclosure.

What is claimed is:

1. A communication system comprising:
   a controller;
   a plurality of devices; and
   a communication channel to which the controller and the
      plurality of devices are connected in a ring, and over which a communication frame including a plurality of packets is transmitted as differential signals, wherein each of the devices is configured to:
- monitor a data transmission amount from the device to the communication channel per unit time,
- determine whether or not the monitored data transmission amount exceeds a threshold value, and
- upon determining that the monitored data transmission amount does not exceed the threshold value, insert data to be transmitted into the communication frame as payload of one of the packets in the communication frame, and upon determining that the monitored data transmission amount exceeds the threshold value, not insert the data to be transmitted into the communication frame.

2. The communication system according to claim 1, wherein the maximum number of packets in the communication frame is less than the number of devices.

3. The communication system according to claim 1, wherein
the threshold value is set in the devices before the communication frame is received over the communication channel.

4. The communication system according to claim 1, wherein
each packet has a header, in which information indicating the threshold value is stored, and a payload, and
the device acquires the threshold value according to the information stored in the header of one of the packets in the communication frame.

5. The communication system according to claim 1, wherein
each packet has a header and a payload, and
each of the devices is configured to:
when information indicating that first information stored in the payload of a first packet in the communication frame is of a first priority, is stored in the header thereof, and the device has second information that is to be transmitted and is of a second priority, replace the first packet with a second packet in which information indicating that the second information is of the second priority, is stored in the header and the second information is stored in the payload.

6. The communication system according to claim 5, wherein the second priority is of a higher priority than the first priority.

7. The communication system according to claim 5, wherein each of the devices that replaces the first packet with the second packet is further configured to:
store the first packet; and
insert the first packet in a subsequent communication frame.

8. A device comprising:
a communication interface circuit to which a controller and a plurality of other devices are connected in a ring by a communication channel, over which a communication frame including a plurality of packets is transmitted as differential signals; and
a control circuit configured to monitor a data transmission amount from the device to the communication channel per unit time and determine whether or not the monitored data transmission amount exceeds a threshold value, wherein
the communication interface circuit is configured to:
insert data to be transmitted into the communication frame as payload of one of the packets in the communication frame when the control circuit determines that the monitored data transmission amount does not exceed the threshold value, and not insert data to be transmitted into the communication frame when the control circuit determines that the monitored data transmission amount exceed the threshold value.

9. The device according to claim 8, wherein
the threshold value is set in the device before the communication frame is received over the communication channel.

10. The device according to claim 8, wherein
each packet has a header, in which information indicating the threshold value is stored, and a payload, and
the control circuit acquires the threshold value according to the information stored in the header of one of the packets in the communication frame.

11. The device according to claim 8, wherein
each packet has a header and a payload, and
the communication interface circuit is configured to:
when information indicating that first information stored in the payload of a first packet in the communication frame is of a first priority, is stored in the header thereof, and the communication interface circuit has second information that is to be transmitted and is of a second priority, replace the first packet with a second packet in which information indicating that the second information is of the second priority, is stored in the header and the second information is stored in the payload.

12. The device according to claim 11, wherein the second priority is of a higher priority than the first priority.

13. The device according to claim 11, wherein each of the devices that replaces the first packet with the second packet is further configured to:
store the first packet; and
insert the first packet in a subsequent communication frame.

14. The device according to claim 8, wherein the maximum number of packets in the communication frame is less than the number of devices.

15. A method of transferring packets between a controller and a plurality of devices that are connected to a communication channel in a ring, wherein the packets are encapsulated into a communication frame that is transmitted over the communication channel as differential signals, said method comprising, at each of the devices:
monitoring a data transmission amount from the device to the communication channel per unit time;
determining whether or not the monitored data transmission amount exceeds a threshold value;
upon determining that the monitored data transmission amount does not exceed the threshold value, inserting data to be transmitted into the communication frame as payload of one of the packets in the communication frame, and upon determining that the monitored data transmission amount exceed the threshold value, determining whether or not a transmission priority indicated in one of the packets in the communication frame is lower than a transmission priority of the data to be transmitted; and
upon determining that the transmission priority indicated in a first packet in the communication frame is lower, inserting the data to be transmitted into the communication frame by replacing the first packet in the communication frame with a second packet that includes the data to be transmitted, and upon determining that the transmission priority indicated in none of the packets in the communication frame is lower, not inserting the data to be transmitted into the communication frame.

16. The method according to claim 15, further comprising:
   determining the threshold value from a header of one of the packets.

17. The method according to claim 15, wherein the maximum number of packets in the communication frame is less than the number of devices.

18. The method according to claim 15, further comprising:
   prior to replacing the first packet in the communication frame with the second packet, storing the first packet for insertion into a subsequent communication frame.

* * * * *